US009590756B2

United States Patent
Caggioni et al.

(10) Patent No.: US 9,590,756 B2
(45) Date of Patent: Mar. 7, 2017

(54) MAPPING A PLURALITY OF SIGNALS TO GENERATE A COMBINED SIGNAL COMPRISING A HIGHER DATA RATE THAN A DATA RATE ASSOCIATED WITH THE PLURALITY OF SIGNALS

(71) Applicant: APPLIED MICRO CIRCUITS CORPORATION, Sunnyvale, CA (US)

(72) Inventors: Francesco Caggioni, Winchester, MA (US); Dimitrios Giannakopoulos, Andover, MA (US)

(73) Assignee: APPLIED MICRO CIRCUITS CORPORATION, Santa Clara, CA (US)

( * ) Notice: Subject to any disclaimer, the term of this patent is extended or adjusted under 35 U.S.C. 154(b) by 327 days.

(21) Appl. No.: 14/027,518

(22) Filed: Sep. 16, 2013

(65) Prior Publication Data

US 2015/0078406 A1  Mar. 19, 2015

(51) Int. Cl.
*H04J 14/08* (2006.01)
*H04J 3/16* (2006.01)
*H04L 12/26* (2006.01)

(52) U.S. Cl.
CPC ................... *H04J 3/1664* (2013.01)

(58) Field of Classification Search
CPC . H04J 3/1611; H04J 3/0623; H04J 2203/0089
USPC ................... 370/506, 535, 537, 907
See application file for complete search history.

(56) References Cited

U.S. PATENT DOCUMENTS

| | | | |
|---|---|---|---|
| 7,512,150 B2 | 3/2009 | Walker et al. | |
| 7,539,196 B2 | 5/2009 | Flavin et al. | |
| 7,742,502 B2 | 6/2010 | Vissers et al. | |
| 8,050,567 B2 * | 11/2011 | Miller | H04J 3/1652 398/140 |
| 8,223,638 B2 | 7/2012 | Walker et al. | |
| 8,238,373 B2 | 8/2012 | Jiang | |
| 8,406,178 B2 | 3/2013 | Tan et al. | |
| 8,412,051 B2 | 4/2013 | El-Ahmadi et al. | |
| 8,514,897 B2 | 8/2013 | Jiang | |
| 8,989,222 B1 * | 3/2015 | Mok | H04J 14/0201 370/474 |
| 2005/0163162 A1 | 7/2005 | Lanzone et al. | |

(Continued)

*Primary Examiner* — Mohamed Kamara
*Assistant Examiner* — Will Lin
(74) *Attorney, Agent, or Firm* — Amin, Turocy & Watson LLP

(57) ABSTRACT

Various aspects provide for mapping a plurality of signals to generate a combined signal. An aggregation component is configured for generating a combined signal that comprises a higher data rate than a data rate associated with a plurality of signals based on mapped data associated with the plurality of signals. The aggregation component comprises a mapper component. The mapper component is configured for generating the mapped data based on a mapping distribution pattern associated with a generic mapping procedure. In an aspect, a de-aggregation component is configured for recovering the plurality of signals from a pseudo signal transmitted at a data rate of the combined signal. In another aspect, the de-aggregation component comprises a de-mapper component configured for de-mapping the mapped data based on the mapping distribution pattern associated with the generic mapping procedure.

21 Claims, 16 Drawing Sheets

(56) References Cited

U.S. PATENT DOCUMENTS

| | | | |
|---|---|---|---|
| 2008/0075113 A1* | 3/2008 | Harley | H04J 3/07 370/466 |
| 2010/0329669 A1* | 12/2010 | Cunningham | H04B 10/40 398/41 |
| 2011/0135312 A1 | 6/2011 | El-Ahmadi et al. | |
| 2012/0014270 A1* | 1/2012 | Honma | H04J 3/07 370/252 |
| 2012/0300771 A1 | 11/2012 | Nonaka et al. | |
| 2013/0058655 A1* | 3/2013 | Okubo | H04J 3/1652 398/66 |
| 2013/0177309 A1 | 7/2013 | El-Ahmadi et al. | |

\* cited by examiner

MAPPING A PLURALITY OF SIGNALS TO GENERATE A COMBINED SIGNAL COMPRISING A HIGHER DATA RATE THAN A DATA RATE ASSOCIATED WITH THE PLURALITY OF SIGNALS

TECHNICAL FIELD

The subject disclosure relates generally to networking, and more particularly to mapping a plurality of signals to generate a combined signal that comprises a higher data rate than a data rate associated with the plurality of signals.

BACKGROUND

Electronic communications, whether over a local or wide-area network or among components of a local bus, can involve a variety of programmed actions and/or protocols. For instance, data to be transmitted throughout a network (e.g., from one electronic component to another) is often organized into subgroups of transmitted information. A networking protocol can specify formats and/or rules for the transmission and/or reception of data (e.g., data signals) within a network (e.g., an Ethernet network). For example, a networking protocol can provide various formats and/or rules for routing data signals in a network (e.g., routing data signals between hubs, switches and/or routers).

Often times, numerous devices in a network are configured to retime, multiplex and/or de-multiplex data signals (e.g., incoming network traffic). For example, a network component can receive one or more 10 gigabit per second (Gbps) Ethernet signals and can output four 25 Gbps Ethernet signals to allow more efficient transport of the data signal throughout the network. However, often times a network includes a variety of signal types (e.g., a variety of network protocols) and/or a variety of signal data rates. However, current network systems do not adequately process and/or transmit network signals associated with various signals types and/or various data rates. Therefore, functionality and/or efficiency of current network systems can be improved.

The above-described description is merely intended to provide a contextual overview of current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises an aggregation component. The aggregation component is configured for generating a combined signal that comprises a higher data rate than a data rate associated with a plurality of signals based on mapped data associated with the plurality of signals. The aggregation component comprises a mapper component. The mapper component is configured for generating the mapped data based on a mapping distribution pattern associated with a generic mapping procedure.

In another example embodiment, a method comprises receiving, by a system comprising a processor, a signal from a plurality of signals. The method also comprises mapping, by the system, the signal based on a mapping distribution pattern associated with a generic mapping procedure to generate mapped data. Additionally, the method comprises generating, by the system, a combined signal that comprises a higher data rate than a data rate associated with the signal based on the mapped data.

In yet another example embodiment, a system includes a means for means for receiving a signal from a plurality of signals. The system also comprises a means for mapping the signal based on a mapping distribution pattern associated with a generic mapping procedure to generate mapped data. Additionally, the system comprises a means for generating a combined signal that comprises a higher data rate than a data rate associated with the plurality of signals based on the mapped data.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
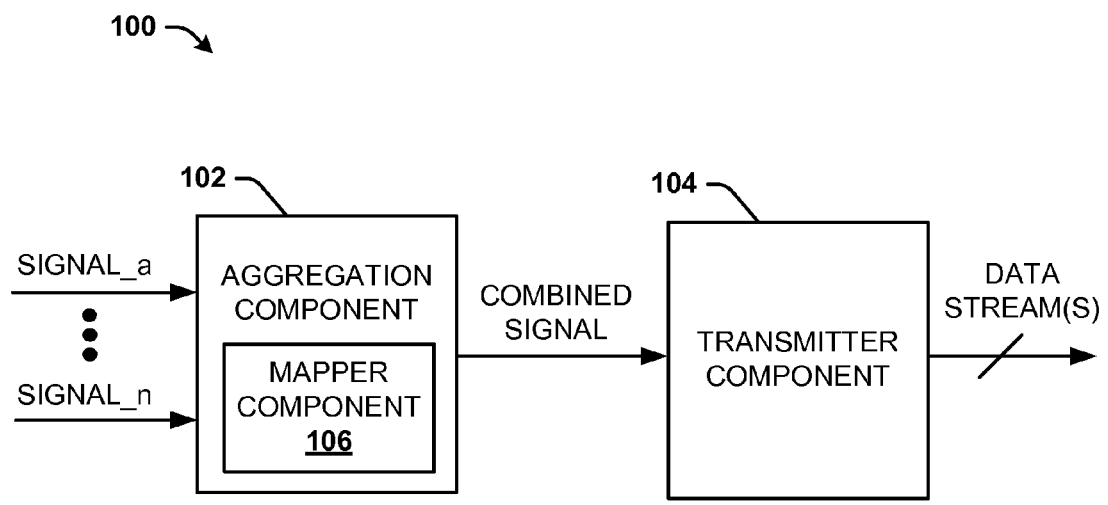
FIG. 1 is a block diagram illustrating an example, non-limiting embodiment of a system for mapping a plurality of signals to generate a combined signal in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide a system for mapping data associated with a plurality of signals to generate a combined signal with a higher data rate than a data rate associated with the plurality of signals. For example, a plurality of first signals with a first data rate (e.g., 10 gigabits per second (Gb/s)) and/or at least one second signal with a second data rate (e.g., 40 Gb/s) can be mapped into a combined signal (e.g., a container signal) with a higher data rate (e.g., 100 Gb/s) than the first data rate associated with the plurality of first signals and/or the second data rate associated with the at least one second signal. Therefore, the plurality of first signals and/or the at least one second signal (e.g., original signals) can be transmitted via one or more interfaces that support a data rate other than the first data rate and/or the second data rate (e.g., one or more interfaces that do not support a data rate of the plurality of first signals and/or the at least one second signal). Furthermore, the plurality of first signals and/or the at least one second signal (e.g., original signals) can be recovered at a different point in a network pipeline (e.g., timing transparency for the original signals can be provided during transmission via a combined signal). As such, a plurality of signals with one or more data rates (e.g., 10 gigabit (G), 40G and/or 100G signals) can be mapped into a combined signal.

In an aspect, the plurality of signals can be mapped based on a mapping distribution pattern associated with a generic mapping procedure (GMP). For example, the GMP can facilitate mapping of the plurality of signals into a payload area (e.g., a payload area of an OTUFlex signal) by dynamically distributing data associated with the plurality of signals in the payload area (e.g., dynamically distributing data throughout available payload positions in the payload area). In an aspect, one or more stuff bytes can be added to the payload area to provide positive justification (e.g., bit stuffing and/or byte stuffing can be implemented to generate the mapping distribution pattern). In one example, location of the one or more stuff bytes within the payload area can be determined based on a data rate of the plurality of signals (e.g., number of incoming bits associated with the plurality of signals). For example, the one or more stuff bytes can be implemented to generate a container signal at a certain data rate. As such, mapping of the plurality of signals can be dynamic based on the data rate of the plurality of first signals. In yet another aspect, a mapping distribution pattern can be generated based at least in part on a Sigma-Delta mapping algorithm. Thus, network components that utilize (e.g., support) a high data rate (e.g., 100G) can transmit signals with a lower data rate (e.g., 10G and/or 40G) over a data link with the high data rate (e.g., 100G). Furthermore, a variety of signal types (e.g., optical transport network (OTN), Ethernet, Fibre Channel (FC), synchronous optical networking (SONET/SDH), other signal types, etc.) can be supported. As such, signal types of different rates can be combined (e.g., transmitted together) based at least in part on the mapping distribution pattern (e.g., the GMP) to enable a multi-port and/or multi-rate system that can support a variety of client signals. Additionally, network clocking can be simplified by mapping different-rate client signals into a single-rate combined signal. Accordingly, network efficiency and/or reliability can be increased.

Turning now to FIG. 1, a block diagram illustrating an example, non-limiting embodiment of a network system in accordance with various aspects described herein is shown. System 100 includes an aggregation component 102 and a transmitter component 104. The aggregation component 102 can include at least a mapper component 106. In one example, the system 100 can be implemented in a data communication system and/or a telecommunication system. For example, the system 100 can be implemented in, but not limited to, an Ethernet network system, an OTN system and/or a FC system. However, it is to be appreciated that the system 100 can be implemented as a different type of network system. Furthermore, it is to be appreciated that the system 100 can be associated with more than one type of data communication system and/or telecommunication system.

In an example, the system 100 can accept data rates and/or generate data rates (e.g., serial data rates) of 10G, 40G and/or 100G (e.g., with virtual lane interleaving nodes). However, it is to be appreciated that the system 100 can be implemented for different data rates (e.g., signal rates). The system 100 can be implemented on a system interface, a client interface, a host interface and/or a line interface. In one example, the system 100 can be implemented on a transmitter device and/or a transceiver device. In an aspect, the system 100 can be implemented on a printed circuit board (PCB). In an aspect, the system 100 can be implemented on an application-specific integrated circuit (ASIC). In yet another aspect, the system 100 can be implemented on and/or in connection with a chassis system. However, it is to be appreciated that the system 100 can be implemented on and/or in connection with a different type of system (e.g., a network box system, etc.).

The aggregation component 102 (e.g., the mapper component 106) can receive a plurality of signals (e.g., SIGNAL_a-SIGNAL_n shown in FIG. 1). In one example, the plurality of signals can be a plurality of client signals. In an aspect, the plurality of signals can be received via and/or associated with one or more channels (e.g., data stream channels). The plurality of signals can be received via and/or associated with one or more physical lanes (e.g., one or more physical connections). For example, the plurality of signals can be received via copper cable, optical fiber and/or wireless transmission medium. The plurality of signals can be implemented as a plurality of OTN signals (e.g., OTU2 signals, out2e signals, OTU1e, OTU3, OU3e2, etc.), a plurality of Ethernet signals, a plurality of Fibre Channel (FC) signals, a plurality of synchronous optical networking signals (SONET/SDH) and/or a plurality of other signals. In an example, the plurality of signals can be encoded signals. In one example, the plurality of signals can be implemented as physical coding sub-layer (PCS) lanes. In one embodiment, the plurality of signals can be generated by a processor (not shown). For example, the plurality of signals can be generated by a network processing unit (NPU). In another embodiment, the plurality of signals can be generated by a media access control (MAC) device (not shown). Furthermore, the plurality of signals can be a serial stream of formatted blocks. For example, the plurality of signals can be a serial stream of 64B/66B formatted blocks (e.g., a 64B/66B encoded signal). In one example, the plurality of signals can include one or more bits (e.g., two bits) for boundary identification, one or more header bits and/or one or more bits (e.g., 64 bits) containing scrambled information.

The plurality of signals can include a plurality of first signals and/or at least one second signal. For example, the plurality of signals can include a plurality of first signals with a first data rate (e.g., 10G) and/or at least one second signal with a second data rate (e.g., 40G, 100G, etc.). However, it is to be appreciated that the aggregation component 102 can receive a different number of signal types (e.g. the aggregation component 102 can receive at least one third signal with a third data rate, etc.). In a non-limiting example, the plurality of signals can include a plurality of 10G signals, at least one 40G signal and/or at least one 100G signal. However, it is to be appreciated that the plurality of signals can include different data rates (e.g., 8G, 20G, 50G, 100G, etc.). Furthermore, it is to be appreciated that the plurality of signals can include different signal types. In an aspect, a data rate of the plurality of signals (e.g., the plurality of first signals and the at least one second signal) can be an approximate data rate. For example, a data rate of the plurality of first signals can be a data rate within a certain range of values (e.g., a range of values around 10G). In another aspect, a data rate of the plurality of signals (e.g., the plurality of first signals and/or the at least one second signal) can be a maximum data rate of the plurality of signals. For example, the plurality of first signals can be a plurality of signals with a data rate less than or equal to 10G.

In an aspect, the mapper component 106 can receive a plurality of first signals. For example, the mapper component 106 can receive a plurality of 10G signals. However, it is to be appreciated that the mapper component 106 can receive a plurality of signals with a different data rate (e.g., 40G). In another aspect, the mapper component 106 can receive a plurality of first signals and at least one second signal (or a plurality of second signals). The at least one second signal can comprise a higher data rate or a lower data rate than the plurality of first signals. For example, the mapper component 106 can receive a plurality of 10G signals (e.g., a plurality of first signals) and at least one 40G signal (e.g., at least one second signal). However, it is to be appreciated that the mapper component 106 can receive a plurality of first signals with a different data rate and/or at least one second signal with a different data rate. In one example, the number of first signals can correspond to the number of second signals. In another example, the number of first signals and the number of second signals can be different. In an aspect, the mapper component 106 can receive the plurality of first signals and/or the at least one second signal via a plurality of data channels.

The mapper component 106 can generate mapped data based on a mapping distribution pattern associated with a Generic Mapping Procedure (GMP). For example, the mapper component 106 can map the plurality of first signals and/or the at least one second signal based on a mapping distribution pattern associated with a GMP. The mapper component 106 can determine a unique mapping distribution pattern for the plurality of first signals and/or the at least one second signal. For example, a mapping distribution pattern can be determined for each signal of the plurality of first signals and/or the at least one second signal. As such, the mapper component 106 can map data associated with the plurality of first signals and/or the at least one second signal based on a GMP.

In an aspect, the mapper component 106 can map data associated with the plurality of first signals and/or the at least one second signal based on a Sigma-Delta mapping algorithm (e.g., a Sigma-Delta mapping distribution pattern). For example, the mapper component 106 can generate the mapping distribution pattern based on a Sigma-Delta mapping algorithm (e.g., a Sigma-Delta mapping distribution pattern). In another aspect, the mapper component 106 can map data associated with the plurality of first signals and/or the at least one second signal as a function of a data rate of the plurality of first signals and/or the at least one second signal. For example, the mapper component 106 can map the data associated with the plurality of first signals and/or the at least one second signal to transform a data rate of the plurality of first signals and/or the at least one second signal into a certain data rate (e.g., a predetermined data rate). In yet another aspect, the mapper component 106 can generate the mapping distribution pattern based on a size of a payload area that stores the mapped data (e.g., a size of a container signal). In yet another aspect, the mapper component 106 can generate a mapping distribution pattern for a particular signal from the plurality of first signals and/or the at least one second signals based on data stored in a different signal from the plurality of first signals and/or the at least one second signal. For example, the mapper component 106 can calculate mapping distribution information (e.g., justification information for rate adaptation of the plurality of first signals and/or the at least one second signal, etc.) for a signal and send the mapping distribution information for the signal (e.g., encode the distribution information for the signal) in a next signal. As such, the mapper component 106 can rate adapt the plurality of first signals and/or the at least one second signal (e.g., based on a GMP).

In one example, the mapper component 106 can rate adapt the plurality of first signals and/or the at least one second signal (e.g., generate a mapping distribution pattern) based at least in part on one or more stuff bytes. The one or more stuff bytes can be other data not associated with the plurality of first signals and/or the at least one second signal. For example, the one or more stuff bytes can each be associated with a predetermined data pattern. In one example, the predetermined data pattern can be a hexadecimal value (e.g., an "A5" hexadecimal value). In an aspect, the number of stuff bytes associated with a mapping distribution pattern can be determined based on a data rate of the plurality of first signals and/or the at least one second signal. As such, the plurality of first signals and/or the at least one second signal can be rate adapted based at least in part on the predetermined data pattern.

In another aspect, the mapper component 106 can map data associated with the plurality of first signals and/or the at least one second signal as a function of a ratio value determined based on a data rate of the plurality of first signals and/or the at least one second signal. For example, the mapper component 106 can generate the mapping distribution pattern based on a ratio value generated as a function of a data rate of the plurality of first signals and/or the at least one second signal. In one example, the mapper component 106 can calculate a ratio value as a function of an amount of data included in the plurality of first signals and/or the at least one signal. In an aspect, the mapper component 106 can calculate the ratio value as a function of a modulus operation. In an aspect, the mapper component 106 can insert one or more stuff bytes before or after one or more bytes associated with the plurality of first signals and/or the at least one second signal based on the ratio value. In one example, a greater number of stuff bytes can correspond to a lower ratio value. As such, the mapping distribution pattern can be varied based on a data rate of the plurality of first signals and/or the at least one second signal.

In an aspect, the mapper component 106 can be configured to map data associated with the plurality of first signals into a plurality of container signals (e.g., a plurality of first container signals) based at least in part on a mapping distribution pattern. Additionally or alternatively, the mapper component 106 can be configured to map data associated with the at least one second signal (e.g., the at least one second signal) into a plurality of container signals (e.g., a plurality of second container signals) based at least in part on a mapping distribution pattern. Each of the plurality of container signals can comprise the same data rate. Therefore, the mapper component 106 can map the plurality of first signals and/or the at least one second signal to match the data rate of the plurality of container signals. In one example, the plurality of first container signals and/or the plurality of second container signals can be a plurality of OTUFlex container signals. For example, an OTUFlex container signal (e.g., an OTUFlex channel) can be an independent data stream (e.g., an independent 10G data stream, etc.) that serves as a container signal for a client signal (e.g., a signal from the plurality of first signals, a signal from the at least one second signal, a tributary signal from the at least one second signal, etc.) which is mapped via the mapper component 106.

In an aspect, the plurality of first signals and/or the at least one second signal can be converted into one or more tributary signals (e.g., one or more sub-signals). As such, the mapper component 106 can receive the plurality of first signals, the at least one second signal and/or one or more tributary signals. For example, a 40G signal (e.g., the at least one second signal) can be converted into four 10G tributary signals (e.g., four 10G sub-signals). As such, each of the four 10G tributary signals (e.g., each of the four 10G sub-signals) can be mapped by the mapper component 106 instead of the 40G signal. Accordingly, each of the one or more tributary signals can be mapped into a container signal.

The mapper component 106 can insert the mapped data included in the plurality of container signals into a payload data field of a plurality of modified signals (e.g., a plurality of modified signals associated with the plurality of signals). For example, data included in a particular container signal from the plurality of container signals can be inserted into a payload data field of a particular modified signal from the plurality of modified signal. As such, the plurality of signals can be rate adapted to a clock domain of the plurality of modified signals.

In an aspect, the aggregation component 102 can convert the plurality of first signals into a plurality of first modified signals. The plurality of first modified signals can comprise a signal format different than the plurality of first signals. In one non-limiting example, the aggregation component can convert ten 10G signals into ten modified 10G signals. In one example, the plurality of first modified signals can be a plurality of OTUFlex signals. Additionally or alternatively, the aggregation component 102 can be configured to reformat the at least one second signal. For example, the aggregation component 102 can convert the at least one second signal into a plurality of second modified signals. The plurality of second modified signals can comprise a signal format different than the at least one second signal.

A data rate of the plurality of modified signals can be frequency-locked to a data rate of a combined signal (e.g., COMBINED SIGNAL shown in FIG. 1). For example, the plurality of first signals and/or the at least one second signal can be rate adapted (e.g., a data rate of the plurality of modified signals can be generated) as a function of a data rate of the combined signal generated by the aggregation component 102. As such, the plurality of modified signals can include a data rate generated based on a signal other than the plurality of first signals. In one example, a data rate of the plurality of modified signals can be a fraction of a data rate (e.g., 1/10 of a data rate) of the combined signal generated by the aggregation component 102.

The plurality of modified signals can be aggregated (e.g., combined) to generate the combined signal (e.g., the combined signal can be generated as a function of the mapping of the plurality of first signals and/or the at least one second signal via the GMP). The combined signal can comprise a higher data rate than a data rate associated with the plurality of signals. As such, a combined signals that comprises a higher data rate than a data rate associated with the plurality of first signals and/or the at least one second signal can be generated based at least in part on mapped data generated by the mapper component 106. In an aspect, the combined signal can include a plurality of virtual lanes. As such, the aggregation component 102 can reformat the plurality of first modified signals and/or the plurality of second modified signals into a plurality of virtual lanes of the combined signal based on a GMP (e.g., the aggregation component 102 can reformat the plurality of first modified signals and/or the plurality of second modified signals as a function of the mapping of the plurality of first signals and/or the at least one second signal via the GMP).

Accordingly, the mapper component 106 can encapsulate various signal types, such as but not limited to, OTN, Ethernet, Fibre Channel, SONET/SDH and/or constant bit rate (CBR), into a single OTUFlex container signal (e.g., the combined signal). Therefore, various signal types (e.g., OTN, Ethernet, Fibre Channel, SONET/SDH, CBR, etc.) can be encapsulated in the combined signal as long as a signal (e.g., a signal of the plurality of signals) is less than a payload rate associated with the combined signal. Additionally, the mapper component 106 can provide timing transparency for the plurality of first signals and/or the at least one second signal, where each source clock associated with the plurality of first signals and/or the at least one second signal can be accurately reproduced (e.g., recovered) later in a network pipeline (e.g., by a receiver component and/or a de-aggregation component).

The transmitter component 104 can be configured to bit interleave the plurality of virtual lanes of the combined signal to generate one or more data streams (e.g., DATA STREAM(S) shown in FIG. 1). The one or more data streams can be a plurality of physical lanes. In one example, the one or more data streams can be a plurality of PCS lanes. As such, mapped data associated with the plurality of first signals and/or the at least one second signal can be encoded in the one or more data streams.

Figure 2:
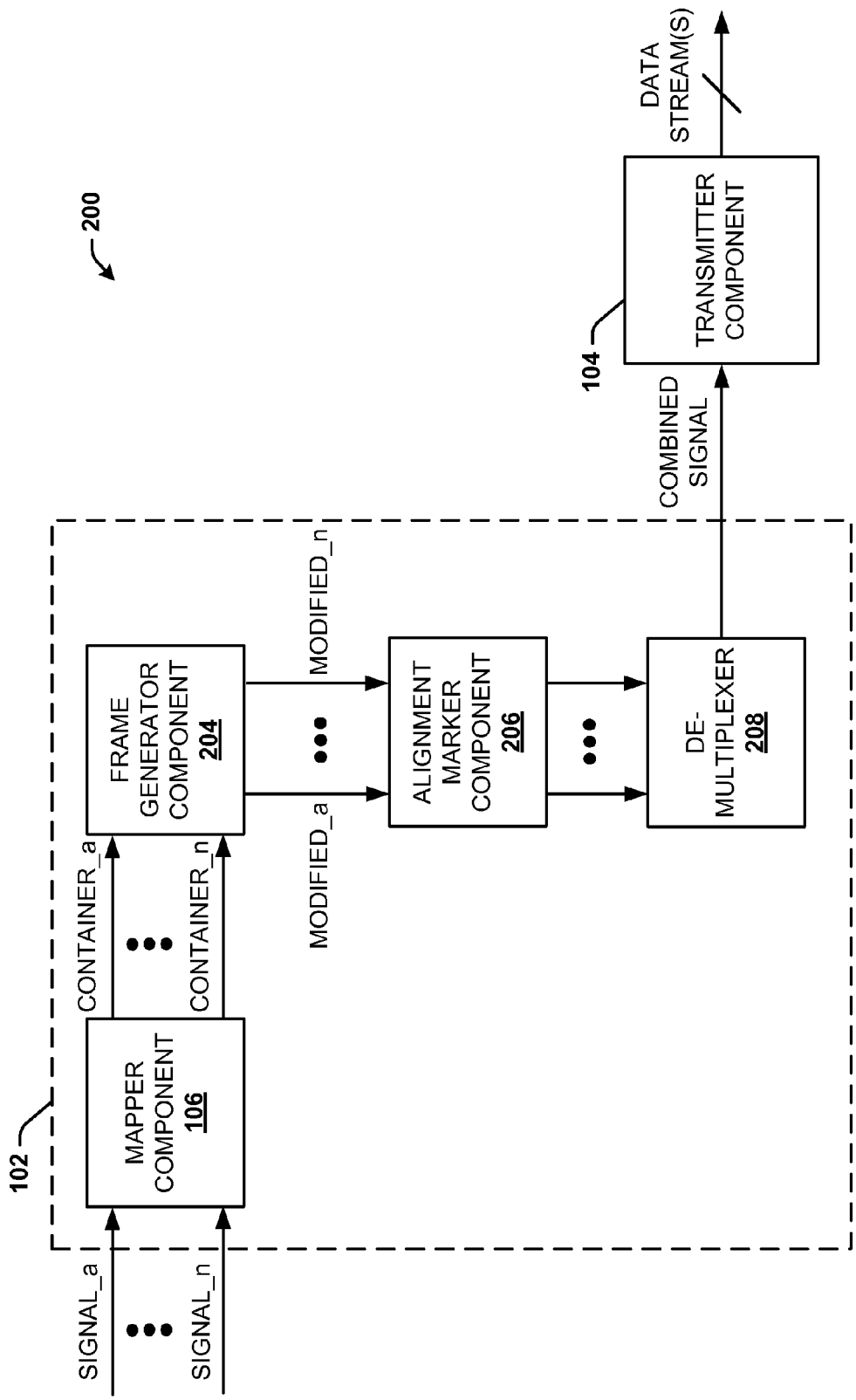
FIG. 2 is a block diagram illustrating an example, non-limiting embodiment of another system for mapping a plurality of signals to generate a combined signal in accordance with various aspects described herein.

Referring now to FIG. 2, a block diagram illustrating an example, non-limiting embodiment of an aggregation component in accordance with various aspects described herein is shown. The aggregation component 102 can include at least the mapper component 106, a frame generator component 204, an alignment marker component 206 and/or a de-multiplexer 208. In one example, the frame generator component 204 can be implemented as an OTUFlex frame generator. In an aspect, the de-multiplexer 208 can be implemented after the alignment marker component 206. In another aspect, the de-multiplexer 208 can be implemented before the alignment marker component 206.

The mapper component 106 can generate a plurality of container signals (e.g., CONTAINER_a-CONTAINTER_n shown in FIG. 2). Mapped data generated by the mapper component 106 can be stored in the plurality of container signals. Furthermore, mapped data generated by the mapper component 106 (e.g., the plurality of container signals) can facilitate generation of a combined signal that comprises a higher data rate than a data rate associated with the plurality of signals (e.g., SIGNAL_a-SIGNAL_n shown in FIG. 2). For example, the frame generator component 204 can be configured to generate a plurality of first modified signals based on the plurality of first container signals. For example, the frame generator component 204 can add mapped data from a first container signal of the plurality of first container signals to a payload field of a corresponding first modified signal. As such, payload fields of the plurality of first modified signals can include mapped data associated with the plurality of first container signals. Additionally or alternatively, the frame generator component 204 can be configured to generate a plurality of second modified signals based on the plurality of second container signals. For example, the frame generator component 204 can add mapped data from a second container signal of the plurality of second container signals to a payload field of a corresponding second modified signal. As such, payload fields of the plurality of second modified signals can include mapped data associated with the plurality of second container signals. Accordingly, the frame generator component 204 can generate a plurality of modified signals (e.g., MODIFIED_a-MODIFIED_n shown in FIG. 2).

The plurality of first modified signals and/or the plurality of second modified signals can be partitioned into a plurality of data fields. The plurality of data fields can comprise at least an alignment marker (AM) field and a payload field. However, the plurality of data fields can additionally include, but is not limited to, a frame alignment signal (FAS) field, a bit interleaved parity 8 (BIP-8) field, an overhead (OH) field and/or a justification (JUST) field. For example, a frame (e.g., a plurality of data field) of a modified signal (e.g., each of the plurality of first modified signals and/or each of the plurality of second modified signals) can include a first field (e.g., FAS field), a second field (e.g., AM field), a third field (e.g., BIP-8 field), a fourth field (e.g., OH field), a fifth field (e.g., JUST field) and a sixth field (e.g., payload field).

The payload field can be a payload area that stores mapped data generated by the mapper component 106. The payload field can include mapped data associated with a container signal (e.g., the payload field can be a data field that includes mapped data from the plurality of first signals and/or the at least one second signal). For example, a container signal from the plurality of first container signals and/or the plurality of second container signals can be included in a payload field of a modified signal. The payload field can include one or more payload bytes (e.g., client data) and/or one or more stuff bytes. The one or more payload bytes (e.g., client data) can correspond to a data associated with a container signal (e.g., a container signal generated from the plurality of first modified signals and/or the plurality of second modified signals). In an aspect, a location of the one or more stuff bytes with respect to the one or more payload bytes can be determined by a mapping algorithm (e.g., a GMP) implemented by the mapper component 106. In one example, the mapping algorithm can be a Sigma-Delta ($\Sigma$-$\Delta$) algorithm.

The alignment marker component 206 can be configured to insert an alignment marker value into the alignment marker field for each of the plurality of first modified signals to identify each of the plurality of first modified signals (e.g., to identify mapped data). The alignment marker component 206 can implement an alignment marker insertion function. In an aspect, the alignment marker component 206 can add an AM value (e.g., an AM value contained in an incrementing counter) to the AM field. Accordingly the alignment marker can facilitate identification and/or alignment of the plurality of virtual lanes of the combined signal.

The de-multiplexer component 208 can be configured to de-multiplex each of the first modified signals into a first virtual lane and a second virtual lane to generate a plurality of virtual lanes of the combined signal. For example, the de-multiplexer 208 can be configured to allocate a portion of each of the first modified signals to a first virtual lane and another portion of each of the first modified signals to a second virtual lane. As such, a first modified signal of the plurality of first modified signals can be de-interleaved into a first virtual lane and a second virtual lane, a different first modified signal of the plurality of first modified signals can be de-interleaved into a different first virtual lane and a different second virtual lane, etc. Additionally or alternatively, the de-multiplexer component 208 can be configured to de-multiplex each of the second modified signals into a first virtual lane and a second virtual lane to generate the plurality of virtual lanes of the combined signal. For example, the de-multiplexer 208 can be configured to allocate a portion of each of the second modified signals to a first virtual lane and another portion of each of the second modified signals to a second virtual lane. As such, a second modified signal of the plurality of second modified signals can be de-interleaved into a first virtual lane and a second virtual lane, a different second modified signal of the plurality of second modified signals can be de-interleaved into a different first virtual lane and a different second virtual lane, etc.

Figure 3:
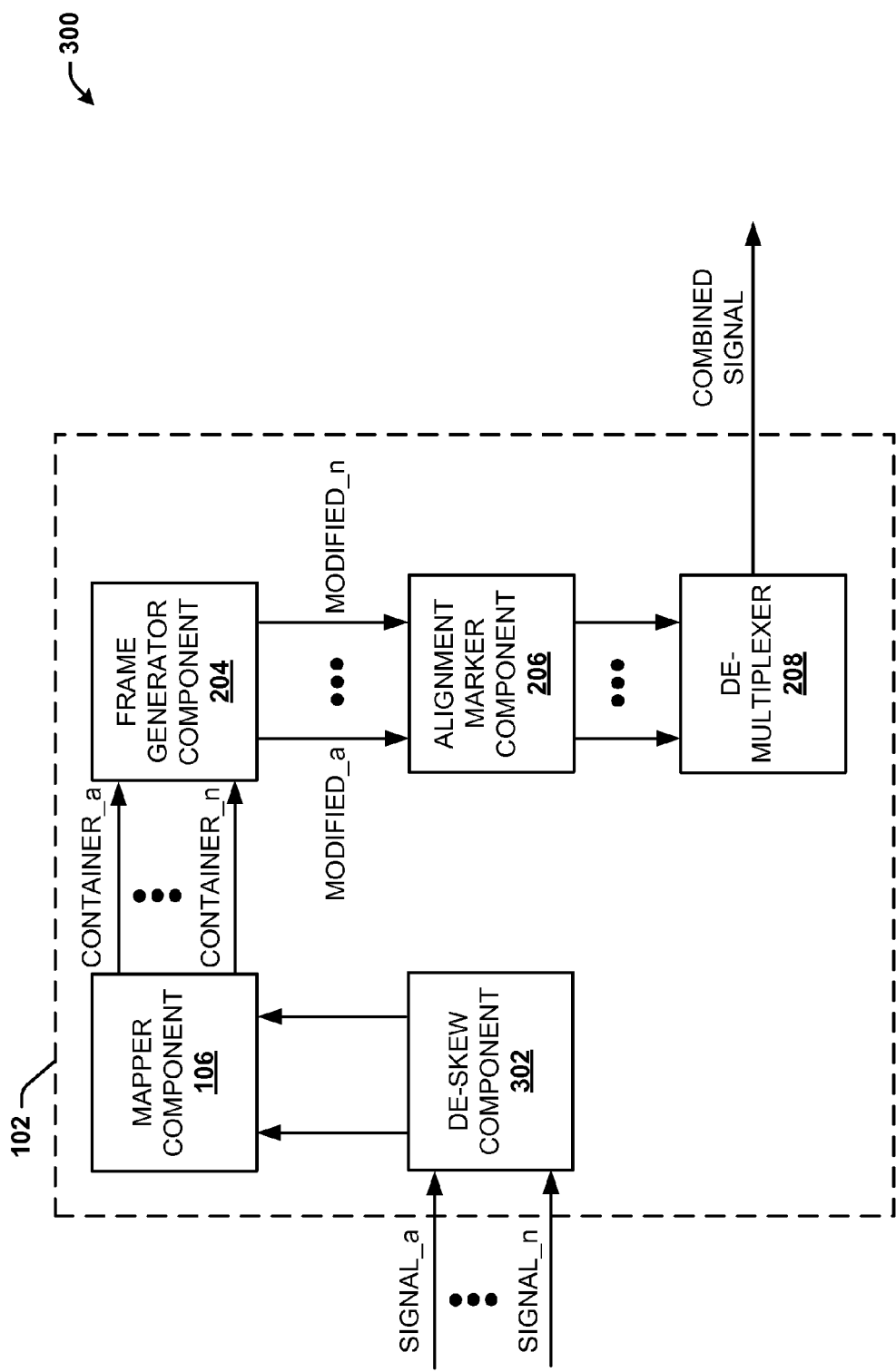
FIG. 3 is a block diagram illustrating an example, non-limiting embodiment of yet another system for mapping a plurality of signals to generate a combined signal in accordance with various aspects described herein.

Referring now to FIG. 3, a block diagram illustrating another example, non-limiting embodiment of an aggregation component in accordance with various aspects described herein is shown. The aggregation component 102 can include at least the mapper component 106, the frame generator component 204, the alignment marker component 206 and/or the de-multiplexer 208. Additionally, the aggregation component 102 can include a de-skew component 302.

The de-skew component 302 can be configured to align the plurality of first signals and/or the plurality of second signal. For example, the de-skew component 302 can implement a de-skew function to align the plurality of first signals and/or the at least one second signal. In an aspect, the de-skew component 302 can implement a de-skew function to align one or more tributary signals (e.g., sub-signals) of the plurality of first signals and/or the at least one second signal. For example, the de-skew component 302 can implement a de-skew function to align four 10G tributary signals (e.g., four 10G sub-signals) of a 40G signal. As such, the de-skew component 302 can be implemented to avoid skew accumulation between the plurality of first signals and/or the at least one second signal (e.g., signal lanes, channels, etc.) over two or more links. The de-skew component 302 can implement de-skewing before the plurality of first signals and/or the plurality of second signal are transmitted to the mapper component 106. Accordingly, the mapper component 106 can map data received by the de-skew component 302.

Figure 4:
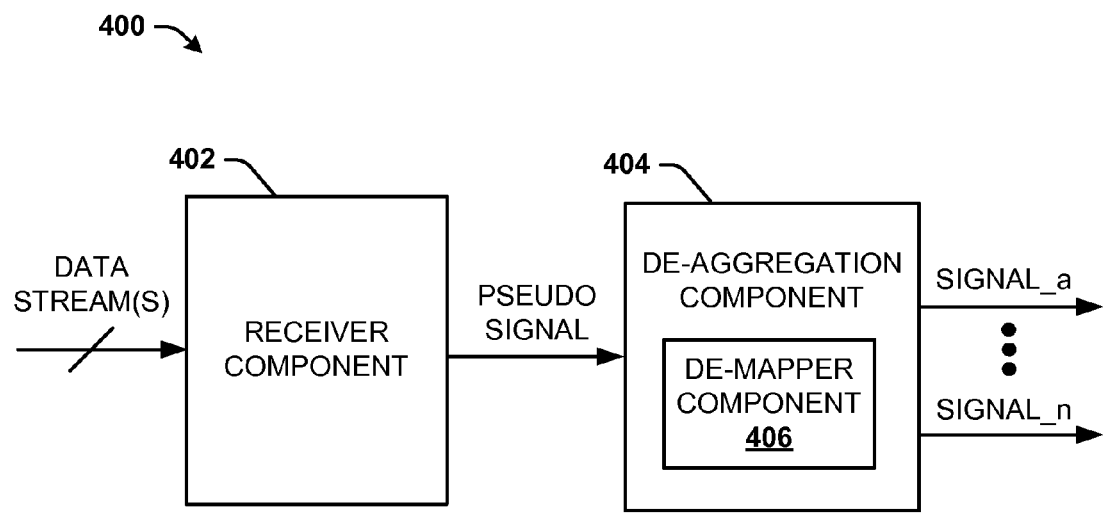
FIG. 4 is a block diagram illustrating an example, non-limiting embodiment of a system for de-mapping a plurality of signals to generate a combined signal in accordance with various aspects described herein.

Referring now to FIG. 4, a block diagram illustrating an example, non-limiting embodiment of a network system in accordance with various aspects described herein is shown. System 400 includes a receiver component 402 and de-aggregation 404. The de-aggregation component 404 can include a de-mapper component 406. In an aspect, system 400 can be implemented in connection with system 100, system 200 or system 300. In one example, the system 400 can be implemented in a data communication system and/or a telecommunication system. For example, the system 400 can be implemented in, but not limited to, an Ethernet network system, an OTN system, a SONET/SDH system and/or a FC system. However, it is to be appreciated that the system 400 can be implemented as a different type of network system. Furthermore, it is to be appreciated that the system 400 can implement more than one type of network system.

The system 400 can be implemented on a system interface, a client interface, a host interface and/or a line interface. In one example, the system 400 can be implemented on a receiver device and/or a transceiver device. In an aspect, the system 400 can be implemented on a PCB. In an aspect, the system 400 can be implemented on an ASIC. In yet another aspect, the system 400 can be implemented on and/or in connection with a chassis system. However, it is to be appreciated that the system 400 can be implemented on and/or in connection with a different type of system (e.g., a network box system, etc.).

The receiver component 402 can be configured to receive one or more data streams. For example, the one or more data streams can be transmitted by the transmitter device 104. The one or more data streams can be a plurality of physical lanes. In one example, the one or more data streams can be a plurality of PCS lanes. In an aspect, a plurality of first signals and/or the at least one second signal can be encoded in the one or more data streams. In one example, the receiver component 402 can be implemented as an inter-device connection compatible with CAUI-4. For example, the receiver component 402 can be implemented as a multi-lane (e.g., 4-lane) 100GBASE-R protocol device. As such, the one or more data streams can be an aggregate data stream (e.g., an aggregate 100G data stream) that comprises one or more physical lanes (e.g., a 100G physical lane, two 50G physical lanes, four 25G physical lanes, five 20G physical lanes, ten 10G physical lanes, etc.).

The receiver component 402 can be configured to de-interleave the one or more data streams to generate a pseudo signal (e.g., PSEUDO SIGNAL shown in FIG. 4) at a data rate of a combined signal (e.g., a combined signal generated by an aggregation component 102). For example, the pseudo signal can correspond to the combined signal generated by the aggregation component 102. In one example, the receiver component 402 can de-interleave the one or more data streams generated by the transmitter component 104. In another example, the receiver component 402 can de-interleave one or more data streams generated by a different component. The pseudo signal can include a plurality of virtual lanes. In one example, the plurality of virtual lanes can be implemented as MLG lanes. In one non-limiting example, the plurality of virtual lanes can be pseudo-100G virtual lanes.

The de-mapper component 406 can de-map mapped data (e.g., mapped data generated by the mapper component 106 and/or the aggregation component 102) based on a mapping distribution pattern associated with GMP. For example, the de-mapper component 406 can de-map the plurality of first signals and/or the at least one second signal from the pseudo signal (e.g., the plurality of modified signals) based on a mapping distribution pattern(s) associated with the mapper component 106. A mapping distribution pattern for each of the plurality of modified signals can be encoded in the pseudo signal. For example, the de-mapper component 406 can de-map the plurality of first signals and/or the at least one second signal from the plurality of modified signals based on a unique mapping distribution pattern determined by the mapper component 106. The plurality of modified signals can be recovered from the pseudo signal (e.g., via the de-aggregation component 404). In an aspect, the de-mapper component 406 can de-map the pseudo signal (e.g., the plurality of modified signals) based on a sigma-delta mapping algorithm(s) associated with the mapper component 106. In another aspect, de-mapper component 406 can de-map a modified signal from the plurality of modified signals based on a different modified signal (e.g., a previous modified signal) from the plurality of modified signals. In yet another aspect, the de-mapper component 406 can de-map a modified signal based on a data rate of the plurality of first signals and/or the at least one second signal.

The de-mapper component 406 can facilitate generation (e.g., recovery) of the plurality of first signals and/or the at least one second signal based on the plurality of first modified signals and/or the plurality of second modified signals. For example, each of the plurality of first signals can be de-mapped from the plurality of first modified signals and/or each of the at least one second signal can be de-mapped from the plurality of second modified signals. Therefore, a pseudo signal transmitted at a data rate of the combined signal can be reverted into a plurality of first signals and/or at least one second signal (e.g., SIGNAL_a-SIGNAL_n shown in FIG. 4). A data rate of the plurality of first signals can be less than a data rate of the plurality of first modified signals and/or a data rate of the at least one second signal can be less than a data rate of the plurality of second modified signals. As such, various signal types can be recovered, such as but not limited to, OTN, Ethernet, SONET/SDH, Fibre Channel and/or CBR, as long as each client rate is less than the payload rate supported by the OTUFlex signal. Accordingly, the de-mapper component 406 can de-map the plurality of first signals and/or the at least one second signal from a plurality of first modified signals and/or a plurality of second modified signals (e.g., the de-mapper 406 can de-map the plurality of modified signals based on the mapping distribution pattern(s) determined by the mapper component 106) to recover a data rate (e.g., a clock rate) associated with the plurality of first signals and/or a data rate (e.g., a clock rate) associated with the at least one second signal.

In one example, a data rate (e.g., a clock rate) of a signal (e.g., the plurality of first signals and/or the at least one second signal) can be recovered based on data stored in a JUST data field of a modified signal (e.g., a recovered modified signal). In an aspect, a data rate (e.g., a clock rate)

of a particular signal from the plurality of first signals and/or the at least one second signal can be recovered based on data stored in a JUST data field of a modified signal associated with a different signal (e.g., a previous signal) from the plurality of first signals and/or the at least one second signal. In another aspect, a data rate of a signal (e.g., the plurality of first signals and/or the at least one second signal) can be determined (e.g., recovered) based on a calculated number of bytes associated with the signal (e.g., within a certain period of a corresponding modified signal).

Figure 5:
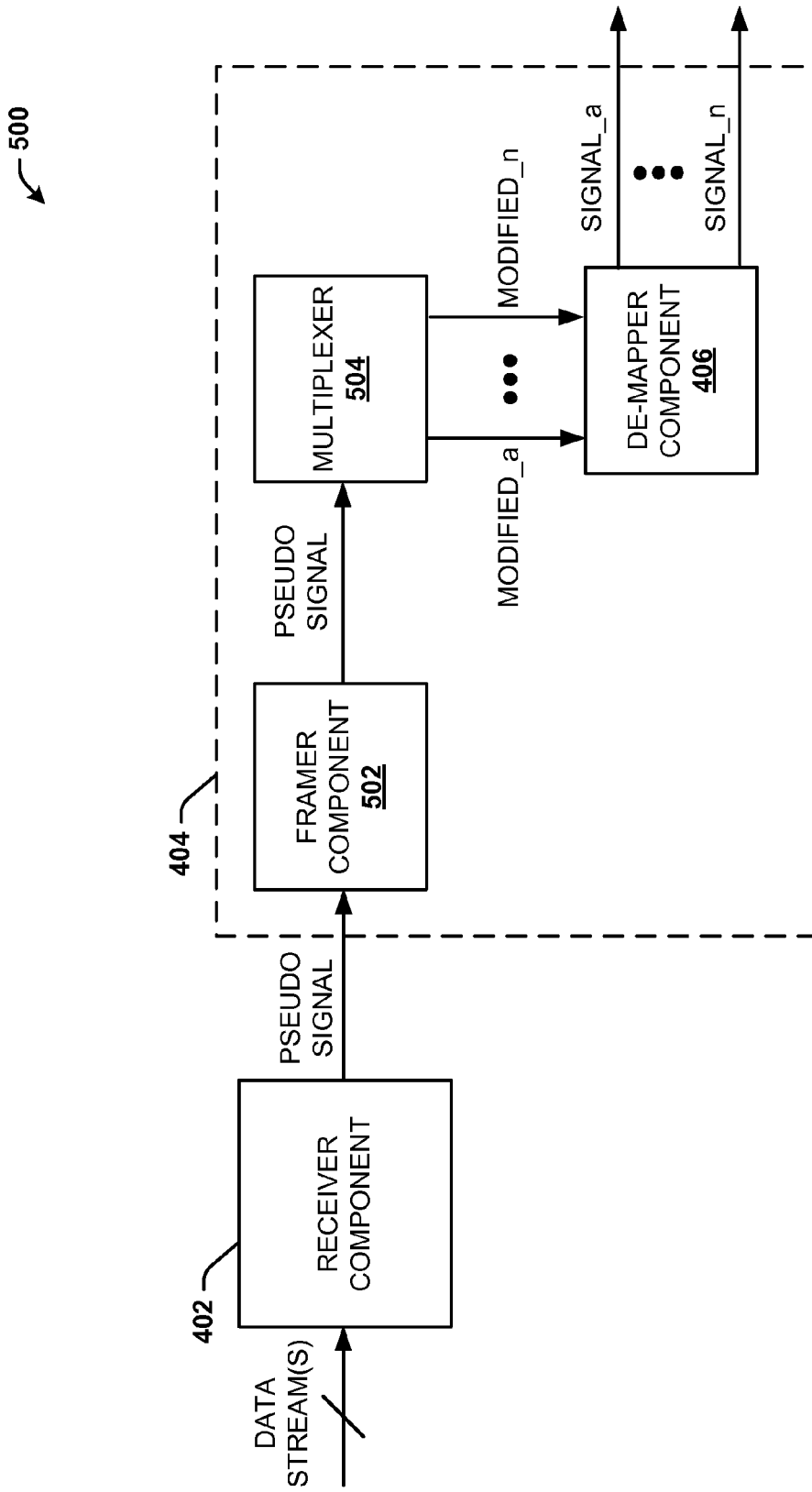
FIG. 5 is a block diagram illustrating an example, non-limiting embodiment of another system for de-mapping a plurality of signals to generate a combined signal in accordance with various aspects described herein.

Referring now to FIG. 5, a block diagram illustrating an example, non-limiting embodiment of an aggregation component in accordance with various aspects described herein is shown. The de-aggregation component 404 can include at least a framer component 502, a multiplexer 504 and/or the de-mapper component 406. In one example, the framer component 502 can be implemented as an OTUFlex framer.

The framer component 502 can receive the pseudo signal (e.g., the plurality of virtual lanes). The framer component 502 can be configured to determine a start of frame position for each of the plurality of virtual lanes of the pseudo signal. For example, the framer component 502 can be configured to determine a start of frame position for each of the plurality of virtual lanes of the pseudo signal based on detection of a FAS field.

The multiplexer 504 can generate (e.g., reconstruct) a plurality of first modified signals and/or a plurality of second modified signals (e.g., MODIFIED_a-MODIFIED_n shown in FIG. 5) based on the pseudo signal (e.g., the plurality of virtual lanes). For example, the multiplexer 504 can reconstruct a modified signal based on a pair of virtual lanes of the pseudo signal that corresponds to the modified signal. In an aspect, the multiplexer 504 can multiplex blocks of data (e.g., blocks of 16 bytes) of a pair of virtual lanes of the pseudo signal into a modified signal (e.g., a single bit stream) based on a round-robin distribution scheme. For example, the multiplexer 504 can apply a first data block of a first virtual lane to a modified signal, a first data block of a second virtual lane to the modified signal, a second data block of the first virtual lane to the modified signal, a second data block of the second virtual lane to the modified signal, etc. As such, each block from a first virtual lane of a modified signal is followed by a next block from a second virtual lane of the modified signal to reconstruct the modified signal. The round-robin distribution scheme can be repeated until an end of a frame. In response to an end of a frame, de-multiplexing can be rotated (e.g., when an end of a current frame is reached, a lane rotation scheme is employed). For example, at the end of each frame, the de-multiplex order can reverse (e.g., rotate) from the current virtual lane to an alternate virtual lane. When an end of a second frame is reached, the de-multiplex order can rotate again. In an aspect, the pseudo signal (e.g., the plurality of virtual lanes) can be de-skewed and/or re-ordered before being received by the multiplexer 504.

In another aspect, the framer component 502 can implement a descrambler to obtain data from the pseudo signal. For example, the framer component 502 can descramble an AM field, a BIP-8 field, an OH field and/or a JUST field of the pseudo signal. As such, the framer component 502 can be configured to determine data included in the pseudo signal (e.g., the plurality of virtual lanes). As such, the de-mapper component 406 can de-map a plurality of modified signals generated by the multiplexer 504.

Figure 6:
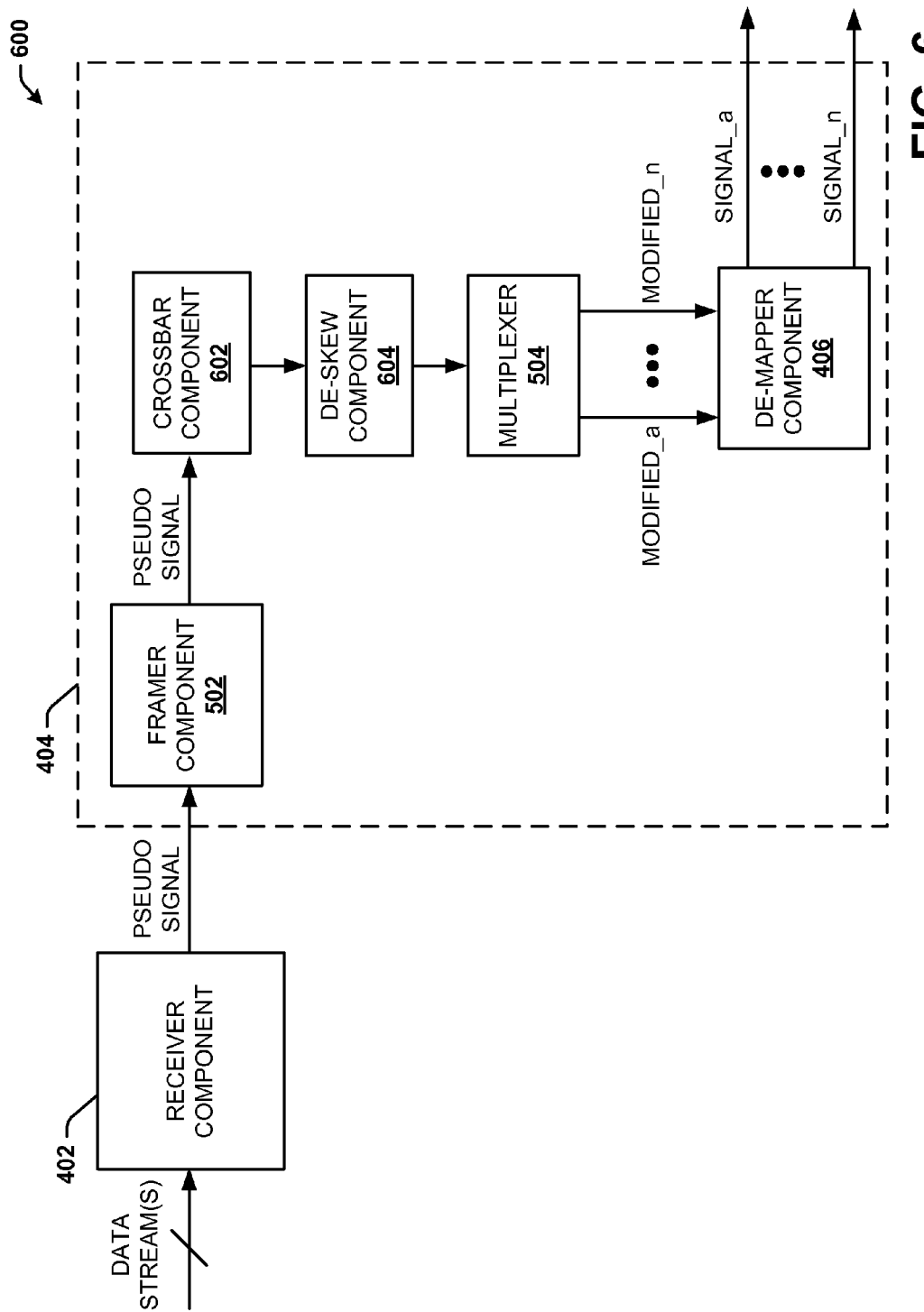
FIG. 6 is a block diagram illustrating an example, non-limiting embodiment of yet another system for de-mapping a plurality of signals to generate a combined signal in accordance with various aspects described herein.

Referring now to FIG. 6, a block diagram illustrating another example, non-limiting embodiment of an aggregation component in accordance with various aspects described herein is shown. The de-aggregation component 404 can include at least the framer component 502, the multiplexer 504 and/or the de-mapper component 406. Additionally, the de-aggregation component 404 can include a crossbar component 602 and/or a de-skew component 604.

The crossbar component 602 can be implemented to map (e.g., arbitrarily map) each of the plurality of virtual lanes of the pseudo signal to a lane slot associated with the receiver component 402. For example, each pair of virtual lanes of the pseudo signal associated with the same modified signal can be grouped together.

The de-skew component 604 can facilitate re-ordering of a pair of virtual lanes of the pseudo signal based on a value (e.g., a modulo operation applied to the value) stored in an AM field. For example, the de-skew component 604 can align each pair of virtual lanes of the pseudo signal such that an alignment marker pair occurs at the same point in time. As such, the de-skew component 604 can perform virtual lane alignment for a pair of virtual lanes as a function of a value stored in an AM field associated with the pair of virtual lanes. Therefore, the plurality of first modified signals and/or the plurality of second modified signals can be re-interleaved in a correct order. Accordingly, the de-skew component 604 can align pairs of virtual lanes (e.g., corresponding pairs of virtual lanes) while not aligning other virtual lanes. As such, the de-mapper component 406 can de-map a plurality of modified signals generated based at least in part on data associated with the crossbar component 602 and/or the de-skew component 604.

Figure 7:
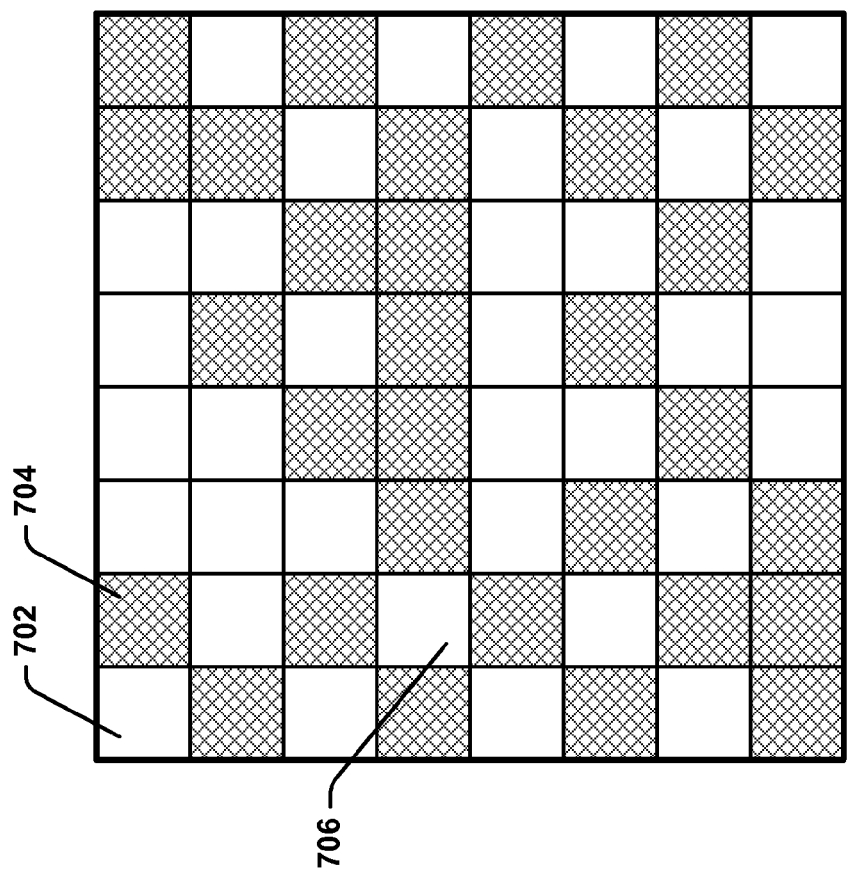
FIG. 7 is an example, non-limiting embodiment of payload data field in accordance with various aspects described herein.

Referring now to FIG. 7, an example, non-limiting embodiment of payload data field in accordance with various aspects described herein is shown. Payload data field 700 can include data associated with the plurality of first signals and/or the at least one second signal (e.g., client data). In an aspect, the payload data field 700 can correspond to a container signal (e.g., mapped data included in a container signal). Additionally, payload data field 700 can include other data associated with a predetermined data pattern (e.g., stuff data, stuff byte(s), etc.). For example, data entity 702 can be data associated with the plurality of first signals and/or the at least one second signal (e.g., client data, payload bytes, etc.). Data entity 704 can be other data associated with a predetermined data pattern (e.g., stuff data).

Client data can be followed by one or more data entities associated with a predetermined data pattern (e.g., stuff data). For example, data entity 706 can be followed by a plurality of data entities associated with a predetermined stuff pattern (e.g., data entity 706 can be followed by five stuff bytes). Furthermore, client data can comprise one or more data entities associated with the plurality of first signals and/or the at least one second signal. For example data entity 704 can be followed by a plurality of data entities associated with the plurality of first signals and/or the at least one second signal (e.g., data entity 704 can be followed by four client bytes). Arrangement (e.g., distribution) of the client data and the stuff data in the payload data field 700 can be determined based on a GMP. For example, the mapper component 106 can be configured to map data associated with the plurality of first signals and/or the at least one second signal into a the payload data field 700 based at least in part on a Sigma-Delta mapping algorithm (e.g., a Sigma-Delta mapping distribution pattern).

In an aspect, the mapper component 106 can map data associated with the plurality of first signals and/or the at least one second signal into the payload data field 700 as a function of a data rate of the plurality of first signals and/or the at least one second signal. In one example, the mapper component 106 can map data associated with the plurality of first signals and/or the at least one second signal into the payload data field 700 as a function of a ratio value determined based on a data rate of the plurality of first signals and/or the at least one second signal. In an aspect, the number of stuff bytes included in the payload data field 700 can be determined based on a data rate of the plurality of first signals and/or the at least one second signal. As such, the mapping distribution pattern associated with the payload data field 700 can be varied based on a data rate of the plurality of first signals and/or the at least one second signal. It is to be appreciated that the mapping distribution pattern (e.g., the payload data field 700) shown in FIG. 7 is merely an example. As such, arrangement of client data and/or stuff data in the payload data field 700 can be varied.

Figure 8:
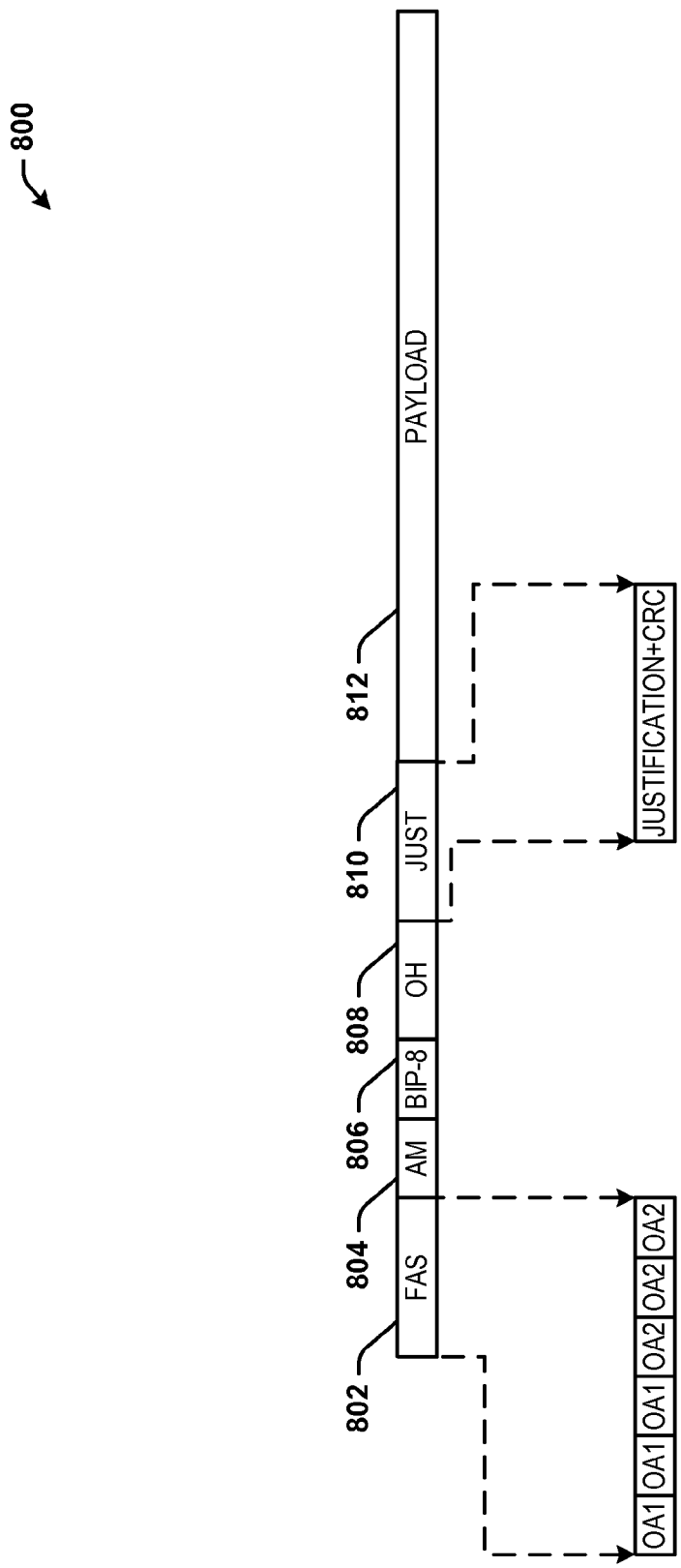
FIG. 8 is an example, non-limiting embodiment of a modified signal in accordance with various aspects described herein.

Referring now to FIG. 8, an example, non-limiting embodiment of a modified signal (e.g., an OTUFlex signal) in accordance with various aspects described herein is shown. Modified signal 800 can be partitioned into a plurality of data fields. For example, a modified signal 800 can include a frame alignment signal (FAS) field 802, an alignment marker (AM) field 804, a bit interleaved parity 8 (BIP-8) field 806, an overhead (OH) field 808 a justification (JUST) field 810 and/or a payload field (e.g., payload data field, payload area, etc.) 812. The payload field 812 can correspond to the payload data field 700.

The FAS field 802 can comprise one or more bytes (e.g., 6 bytes). The FAS field 802 can indicate a start of a frame (e.g., a first partition of a frame for a modified signal). The FAS field 802 can be repeated periodically (e.g., after a last partition of a frame for a modified signal is generated). For example, the FAS field 802 can be repeated after a payload field is generated. The FAS field 802 can include a pattern of data. For example, the FAS field 802 can include a first byte of data (e.g., OA1) that is repeated one or more times and a second byte of data (e.g., OA2) that is repeated one or more times (e.g., a OA1-OA1-OA1-OA2-OA2-OA2 pattern). In one example, the first byte of data can be represented as "1111 0110" and the second byte of data can be represented as "0010 1000". However, it is to be appreciated that a different number of byte values and/or different byte values can be utilized.

The FAS field 802 can be followed by the AM field 804. The AM field 804 can be implemented for lane identification and/or de-skewing purposes. In one example, the AM field 804 can be a 1-byte data field. A value of the AM field 804 can be incremented every frame. In an aspect, a value of the AM field 804 can be generated by and/or associated with a roll-over counter. In one example, a value (e.g., a modulo operation on the value) included in the AM field 804 can specify a virtual lane identification (ID). For example, a virtual lane ID can be specified for each of the plurality of virtual lanes of the combined signal. In an aspect, a value of "0" (e.g., which can result from the modulo operation on the value included in the AM field 804) can represent a first virtual lane (e.g., virtual lane 0) of a modified signal and a value of "1" (e.g., which can result from the modulo operation on the value included in the AM field 804) can represent a second virtual lane (e.g., virtual lane 1) of a modified signal. The value (e.g., the actual value) of the AM field 804 can be utilized by the de-aggregation component 404 for de-skewing the plurality of virtual lanes included in the combined signal.

The BIP-8 field 806 can be utilized for monitoring purposes. In one example, a value for the BIP-8 field 806 can be computed as a function of bits associated with the AM field 804, the OH field 808, the JUST field 810, and/or the payload field 812. As such, a value for the BIP-8 field 806 can be generated as a function of the AM field 804, the OH field 808, the JUST field 810, and/or the payload field 812 (e.g., a value for the BIP-8 field 806 can be generated without data included in the FAS field 802). In an aspect, the BIP-8 field 806 can be a third partition of a frame. In one example, the BIP-8 field 806 can be associated with even parity error checking. In another example, the BIP-8 806 field can be associated with odd parity error checking.

The OH field 808 can be implemented for overhead purposes. A value of the OH field 808 can be all zeros when the OH field 808 is not utilized (e.g., prior to scrambling). In one example, the OH field 808 can be two bytes. However, it is to be appreciated that the OH field 808 can be a different size.

The JUST field 810 can include one or more bytes associated with justification information (e.g., for rate adaptation of the plurality of first signals and/or the at least one second signal) and/or cyclic redundancy check (CRC) parity protection. In one example, the JUST field 810 can be associated with GMP data. In an aspect, the JUST field 810 can store timing information associated with the plurality of first signals and/or the at least one signal. In another aspect, the JUST field 810 can store information that is associated with other signals (e.g., signals not associated with the particular JUST field). For example, the JUST field 810 can store information associated with a next signal and/or a previous signal. In yet another aspect, the JUST field 810 can store information associated with the distribution of groups of data. In yet another aspect, the JUST field 810 can store a number of tributary signals generated from the plurality of first signals and/or the at least one second signal.

In an aspect, the JUST field 810 can be partitioned into a plurality of groups for justification control. For example, the JUST field 810 can be portioned into a first group of data associated with justification information and a second group of data associated with the plurality of first signals and/or the at least one second signal. In an example, the first group of data can be partitioned into a plurality of bytes of data (e.g., three bytes of data). The first group of data can include, but is not limited to, an increment indicator field, a decrement indicator field and/or an error check code field. In another example, the second group of data can be partitioned into a plurality of bytes of data (e.g., three bytes of data). In one example, the second group of data can include timing information for the plurality of first signals and/or the at least one second signal.

The payload field 812 can be a payload area. The payload field 812 can include data associated with a container signal (e.g., the payload field 812 can be a data field that includes data from the plurality of first signals and/or the at least one second signal). For example, a container signal from the plurality of first container signals and/or the plurality of second container signals can be included in a payload field 812 of the modified signal 800. The payload field 812 can include one or more payload bytes and/or one or more stuff bytes. The one or more payload bytes can correspond to a data associated with a container signal (e.g., a container signal generated from the plurality of first modified signals and/or the plurality of second modified signals). In an aspect, a location of the one or more stuff bytes with respect to the one or more payload bytes can be determined by a mapping algorithm (e.g., a mapping distribution pattern associated with a GMP) implemented by the mapper component 106. In one example, the mapping algorithm can be a Sigma-Delta (Σ-Δ) algorithm. A stuff value for each stuff byte can be a predetermined stuff value. For example, a value for each stuff byte (e.g., a predetermined stuff value) can be a particular hexadecimal value (e.g., an "A5" hexadecimal value). In an aspect, a predetermined stuff value can be a pattern that includes a certain number (e.g., a minimum number) of 1/0 (or 0/1) bit transitions. For example, the payload field 812 can be unscrambled (e.g., data included in the payload field can be unscrambled). As such, a predetermined stuff value other than a value of all "0" bits or all "1" bits can be utilized. In one example, the payload field 812 can be 16304 bytes.

In an aspect, the AM field 804, the BIP-8 field 806, the OH field 808 and/or the JUST field 810 can be scrambled. In one example, the AM field 804, the BIP-8 field 806, the OH field 808 and/or the JUST field 810 can be scrambled based on a scrambler associated with a polynomial function (e.g., 1+x+x3+x12+x16). In an aspect, the scrambler can reset (e.g., reset to hexadecimal value "FFFF") a most significant bit of a frame after a last framing byte in the frame.

In view of the example systems described above, methods that may be implemented in accordance with the described subject matter may be better appreciated with reference to the flow charts of FIGS. 9-14. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 9:
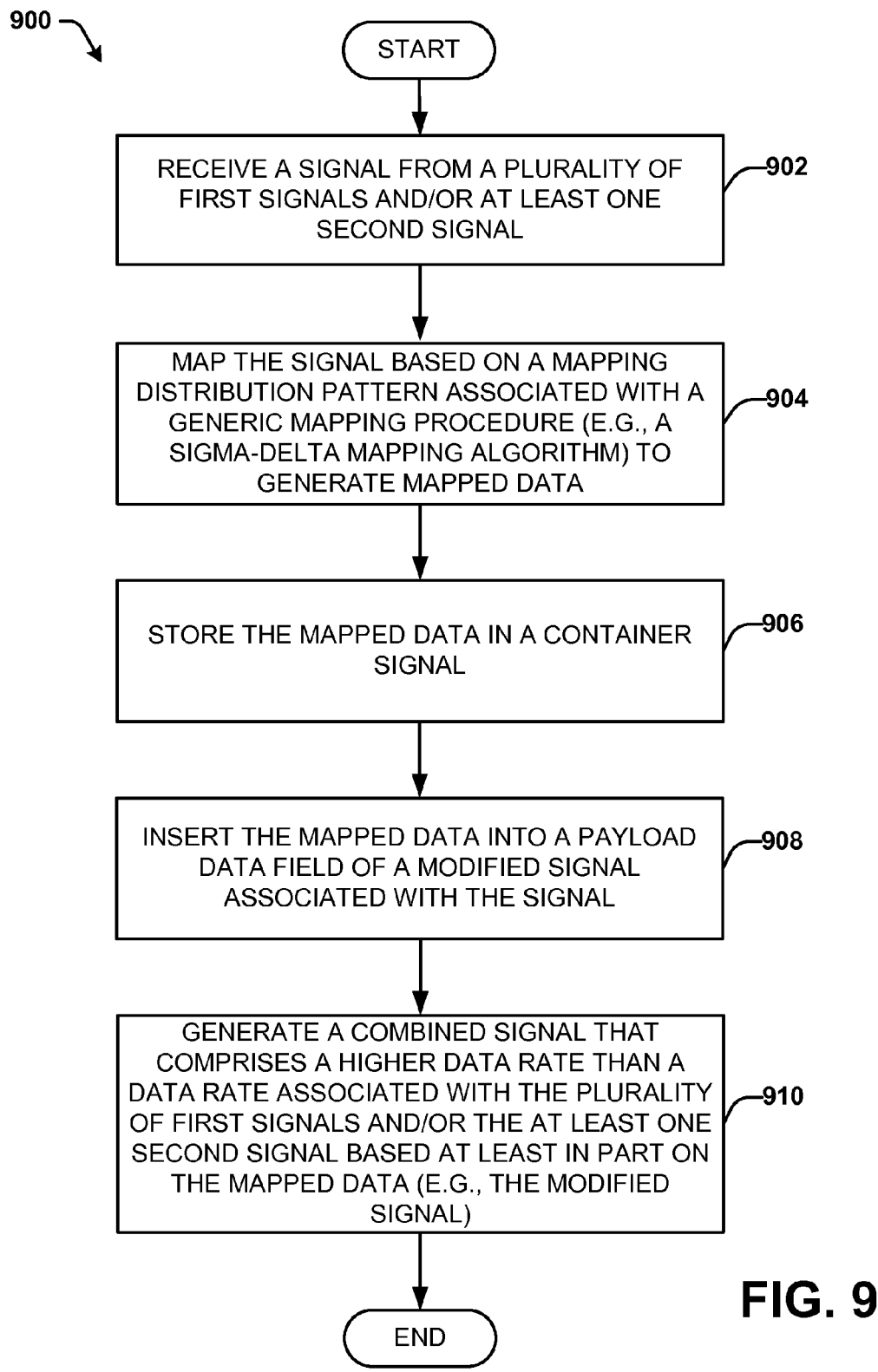
FIG. 9 illustrates a flow diagram of an example, non-limiting embodiment of a method for mapping a plurality of signals.

Referring now to FIG. 9, a flow diagram of an example, non-limiting embodiment of a method for mapping a plurality of signals is shown. Method 900 can begin at block 902, where a signal from a plurality of first signals and/or at least one second signal is received (e.g., by a mapper component 106). For example, the plurality of first signals can include a first data rate (e.g., 10G) and/or the at least one second signal can include a second data rate (e.g., 40G). Furthermore, the plurality of first signals and/or the at least one second signal can include one or more signal types (e.g., OTN, Ethernet, FC, SONET/SDH, CBR and/or other signal types).

At block 904, the signal is mapped (e.g., by a mapper component 106) based on a mapping distribution pattern associated with a generic mapping procedure (e.g., a sigma-delta mapping algorithm) to generate mapped data. In an aspect, the mapping distribution pattern can be determined based on a data rate of the signal. For example, distribution of data associated with the signals and/or other data associated with a predetermined data pattern (e.g., stuff byte(s)) can be determined based on a data rate of the signal.

At block 906, the mapped data is stored (e.g., using a mapper component 106) in a container signal. For example, the container signal can comprise a different data rate than a data rate of the signal.

At block 908, the mapped data is inserted into a payload data field of a modified signal associated with the signal (e.g., using a mapper component 106). For example, the modified signal can include one or more data fields (e.g., at least a payload data field to store the mapped data included in the container signal). A data rate of the modified signal can be rate adapted based on the mapping distribution pattern.

At block 910, a combined signal that comprises a higher data rate than a data rate associated with the plurality of first signals and/or the at least one second signal is generated (e.g., using an aggregation component 102) based at least in part on the mapped data (e.g., the modified signal). For example, the combined signal can include a plurality of virtual lanes. The plurality of virtual lanes can include a plurality of pairs of virtual lanes. A particular pair of virtual lanes can be associated with the modified signal (e.g., the mapped data associated with the signal).

Figure 10:
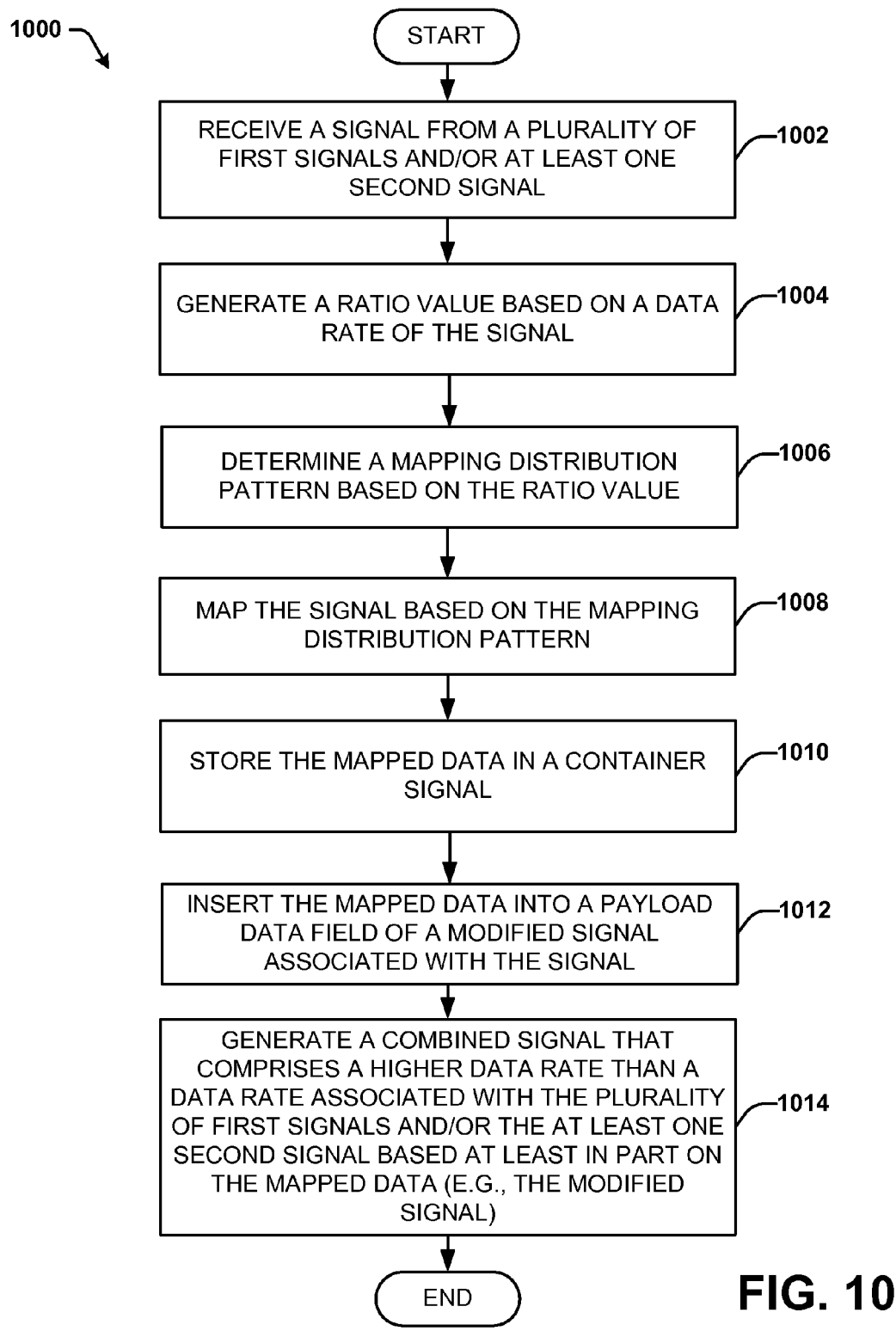
FIG. 10 illustrates a flow diagram of another example, non-limiting embodiment of a method for mapping a plurality of signals.

Referring now to FIG. 10, a flow diagram of another example, non-limiting embodiment of a method for mapping a plurality of signals is shown. Method 1000 can begin at block 1002, where a signal from a plurality of first signals and/or at least one second signal is received (e.g., by a mapper component 106). At block 1004, a ratio value is generated (e.g., by a mapper component 106) based on a data rate of the signal. At block 1006, a mapping distribution pattern is determined (e.g., by a mapper component 106) based on the ratio value. At block 1008, the signal is mapped (e.g., by a mapper component 106) based on the mapping distribution pattern. At block 1010, the mapped data is stored (e.g., using a mapper component 106) in a container signal. At block 1012, the mapped data is inserted into a payload data field of a modified signal associated with the signal (e.g., using a mapper component 106). At block 1014, a combined signal that comprises a higher data rate than a data rate associated with the plurality of first signals and/or the at least one second signal is generated (e.g., using an aggregation component 102) based at least in part on the mapped data (e.g., the modified signal).

Figure 11:
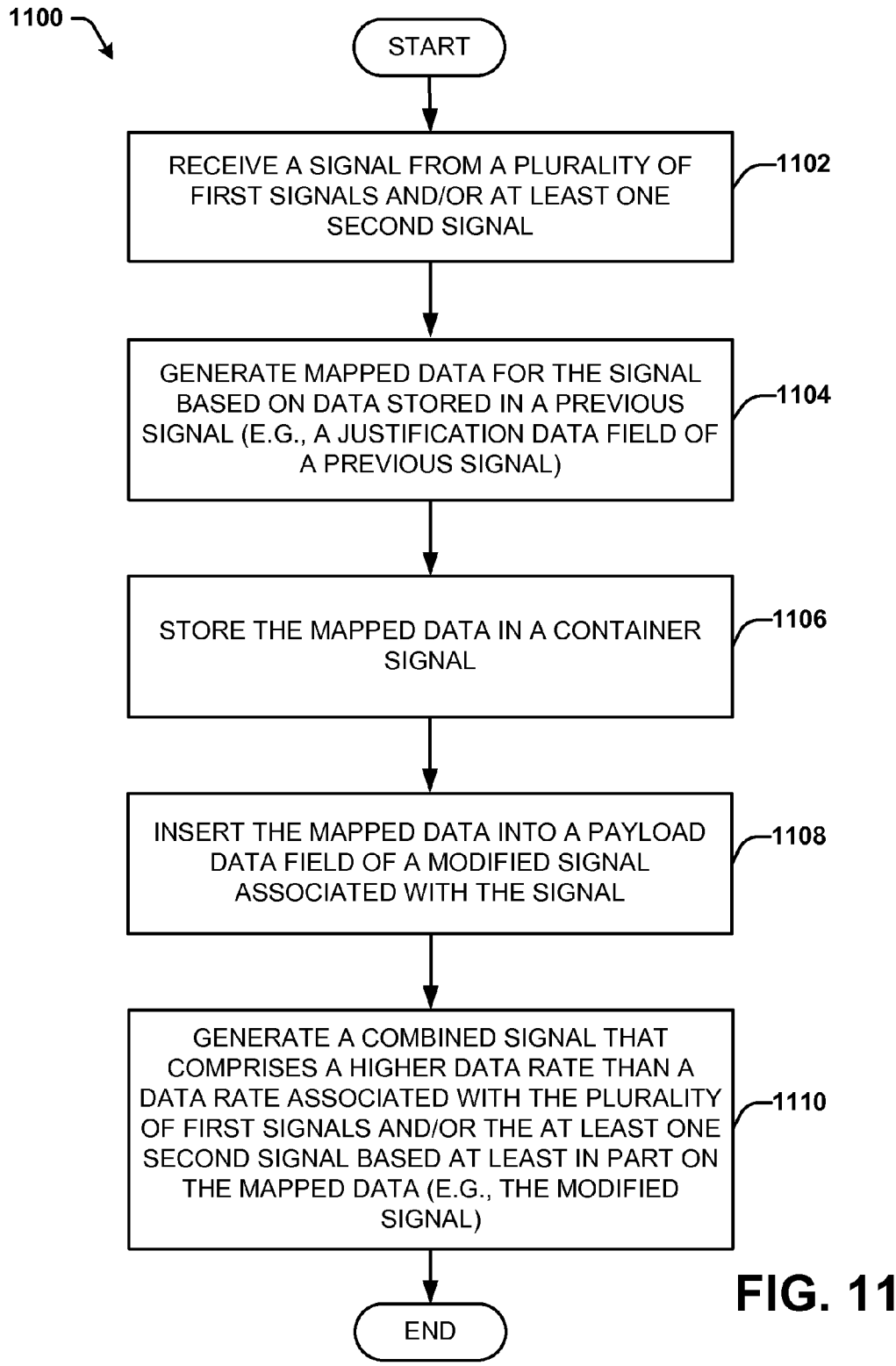
FIG. 11 illustrates a flow diagram of yet another example, non-limiting embodiment of a method for mapping a plurality of signals.

Referring now to FIG. 11, a flow diagram of yet another example, non-limiting embodiment of a method for mapping a plurality of signals is shown. Method 1100 can begin at block 1102, where a signal from a plurality of first signals and/or at least one second signal is received (e.g., by a mapper component 106). At block 1104, mapped data for the signal is generated (e.g., by a mapper component 106) based on data stored in a previous signal (e.g., a justification data field of a previous signal). At block 1106, the mapped data is stored (e.g., using a mapper component 106) in a container signal. At block 1108, the mapped data is inserted into a payload data field of a modified signal associated with the signal (e.g., using a mapper component 106). At block 1110, a combined signal that comprises a higher data rate than a data rate associated with the plurality of first signals and/or the at least one second signal is generated (e.g., using an aggregation component 102) based at least in part on the mapped data (e.g., the modified signal).

Figure 12:
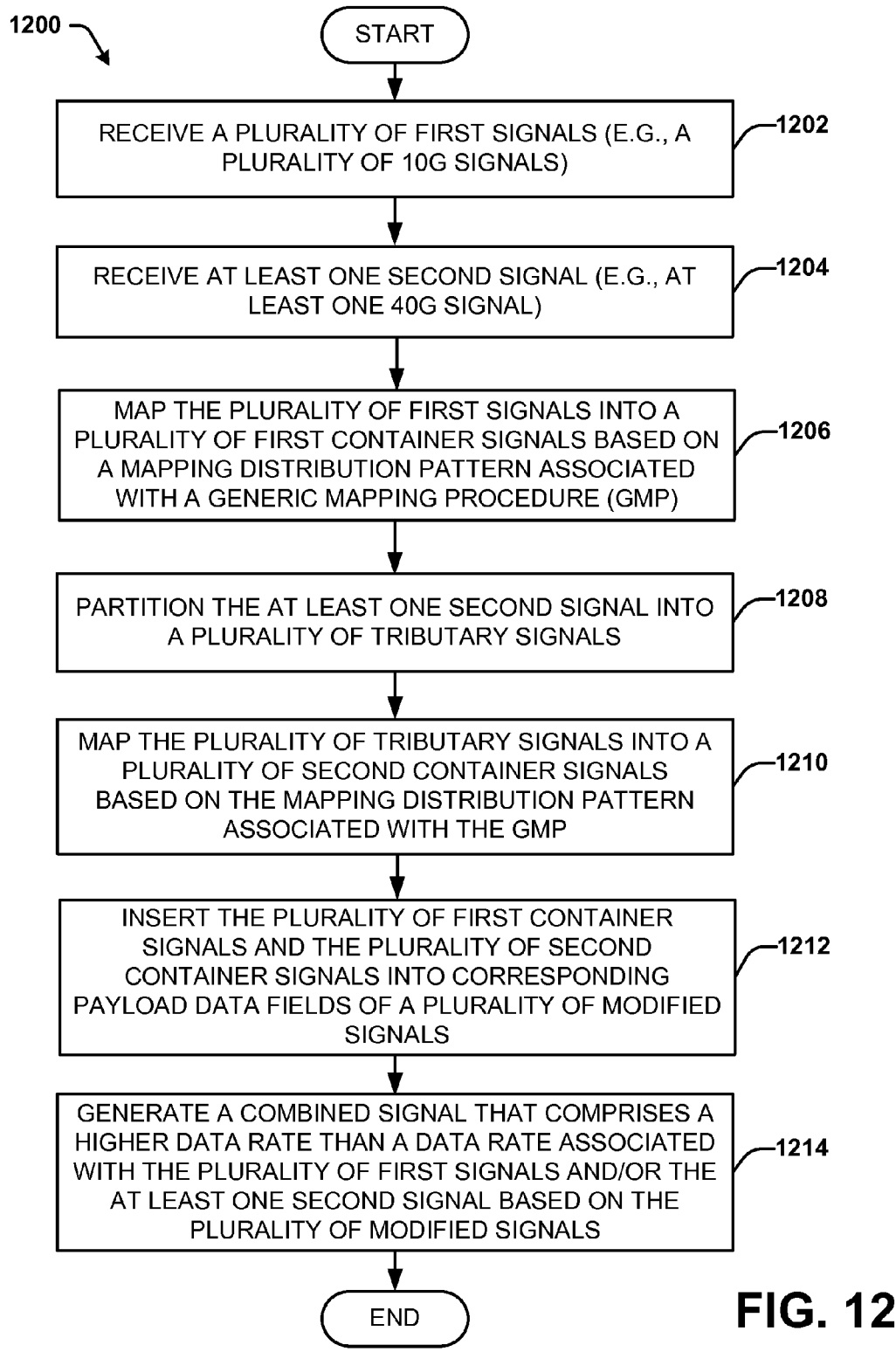
FIG. 12 illustrates a flow diagram of an example, non-limiting embodiment of a method for mapping a plurality of first signals and at least one second signal.

Referring now to FIG. 12, a flow diagram of an example, non-limiting embodiment of a method for mapping a plurality of first signals and/or at least one second signal is shown. Method 1200 can begin at block 1202, where a plurality of first signals (e.g., a plurality of 10G signals) are received (e.g., by a mapper component 106). For example, the plurality of first signals can include a first data rate (e.g., 10G). Furthermore, the plurality of first signals can include one or more signal types (e.g., OTN, Ethernet, FC, SONET/SDH, CBR and/or other signal types).

At block 1204, at least one second signal (e.g., at least one 40G signal) is received (e.g., by a mapper component 106). For example, the at least one second signal can include a second data rate (e.g., 40G). Furthermore, the at least one second signal can include the same or a different data type that the plurality of first signals.

At block 1206, the plurality of first signals are mapped into a plurality of first container signals (e.g., by a mapper component 106) based on a mapping distribution pattern associated with a Generic Mapping Procedure (GMP). For example, the plurality of first signals can be mapped into a plurality of first container signals based on a Sigma-Delta mapping algorithm.

At block 1208, the at least one second signal is partitioned into a plurality of tributary signals (e.g., by an aggregation component 102). For example, a data rate of each of the plurality of tributary signals can correspond to a data rate of each of the plurality of first signals.

At 1210, the plurality of tributary signals are mapped into a plurality of second container signals (e.g., by a mapper component 106) based on the mapping distribution pattern associated with the GMP. For example, the plurality of tributary signals can be mapped into a plurality of second container signals based on a Sigma-Delta mapping algorithm.

At 1212, the plurality of first container signals and the plurality of second container signals are inserted into corresponding payload data fields of a plurality of modified signals (e.g., by a mapper component 106). For example, a payload data field of a modified signal from the modified signals can include mapped data from a container signal from the plurality of first container signals or the plurality of second container signals.

At 1214, a combined signal that comprises a higher data rate than a data rate associated with the plurality of first signals and/or the at least one second signal is generated (e.g., using an aggregation component 102) based on the plurality of modified signals. For example, the combined signal can comprise a higher data rate (100G) than the plurality of first signals, the at least one second signal, the plurality of first container signals and/or the plurality of second container signals. The combined signal can include the mapped data associated with the plurality of first signals and/or the at least one second signal.

Figure 13:
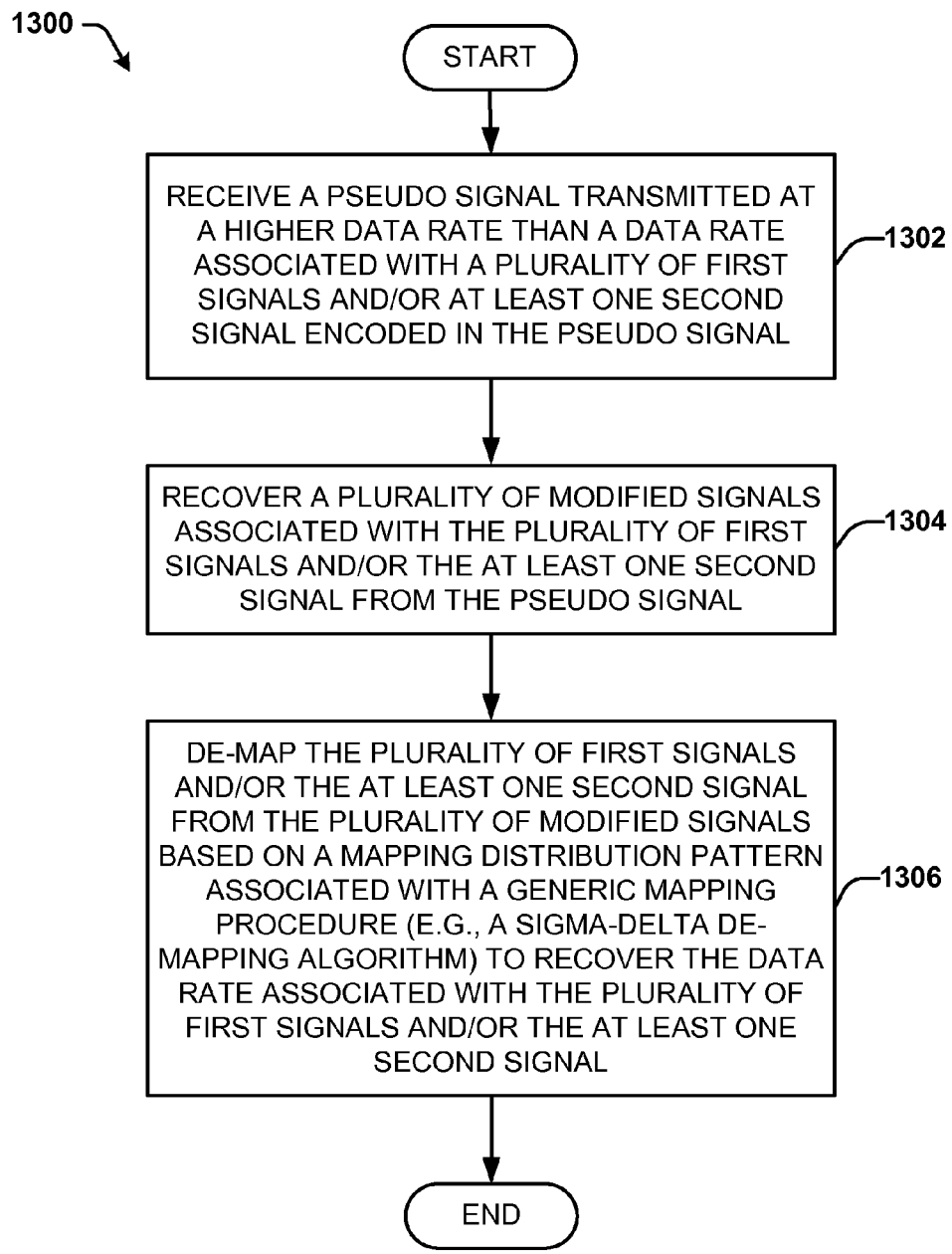
FIG. 13 illustrates a flow diagram of an example, non-limiting embodiment of a method for de-mapping a plurality of signals.

Referring now to FIG. 13, a flow diagram of an example, non-limiting embodiment of a method for de-mapping a plurality of signals is shown. Method 1300 can begin at block 1302, where a pseudo signal transmitted at a higher data rate than a data rate associated with a plurality of first signals and/or at least one second signal encoded in the pseudo signal is received (e.g., by a framer component 502). In one non-limiting example, the plurality of first signals can be a plurality of 10G signals, the at least one second signal can be at least one 40G signal and the pseudo signal can be a 100G signal. At 1304, a plurality of modified signals associated with the plurality of first signals and/or the at least one second signal are recovered from the pseudo signal (e.g., using a de-aggregation component 404). For example, the plurality of first signals and/or the at least one second signal can be encoded in the plurality of modified signals. At 1306, the plurality of first signals and/or the at least one second signal are de-mapped from the plurality of modified signals (e.g., by a de-mapper component 406) based on a mapping distribution pattern associated with a generic mapping procedure (e.g., a sigma-delta de-mapping algorithm) to recover the data rate associated with the plurality of first signals and/or the at least one second signal. For example, the plurality of first signals and/or the at least one second signal can be de-mapped from the plurality of modified signals based on a mapping distribution information encoded in the plurality of modified signals and/or generated by a mapper component (e.g., mapper component 106) included in an aggregation component (e.g., aggregation component 102). As such, a data rate associated with the plurality of first signals (e.g., the plurality of 10G signals) and/or a data rate associated with the at least one second signal (e.g., the at least one 40G signal) can be recovered.

Figure 14:
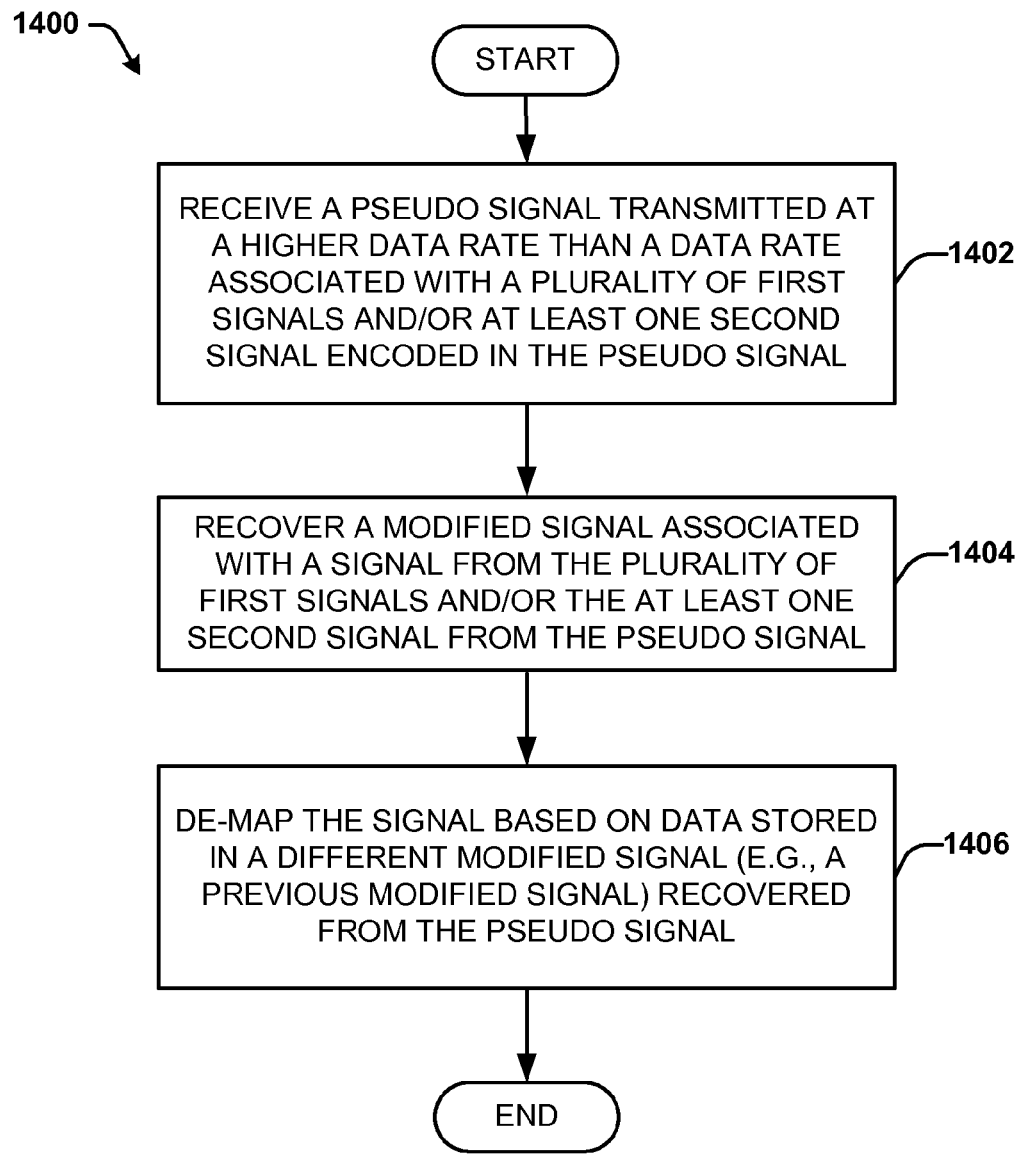
FIG. 14 illustrates a flow diagram of another example, non-limiting embodiment of a method for de-mapping a plurality of signals.

Referring now to FIG. 14, a flow diagram of another example, non-limiting embodiment of a method for de-mapping a plurality of signals is shown. Method 1400 can begin at block 1402, where a pseudo signal transmitted at a higher data rate than a data rate associated with a plurality of first signals and/or at least one second signal encoded in the pseudo signal is received (e.g., by a framer component 502). At 1404, a modified signal associated with a signal from the plurality of first signals and/or the at least one second signal is recovered from the pseudo signal (e.g., using a de-aggregation component 404). For example, at least a portion of a signal from the plurality of first signals and/or the at least one second signal can be encoded in the modified signal. At 1406, the signal is de-mapped (e.g., by a de-mapper component 406) based on data stored in a different modified signal (e.g., a previous modified signal) recovered from the pseudo signal. For example, the data stored in a different modified signal (e.g., a previous modified signal) can be data associated with a mapping distribution pattern associated with a generic mapping procedure (e.g., a sigma-delta mapping algorithm).

Example Computing Environment

Figure 15:
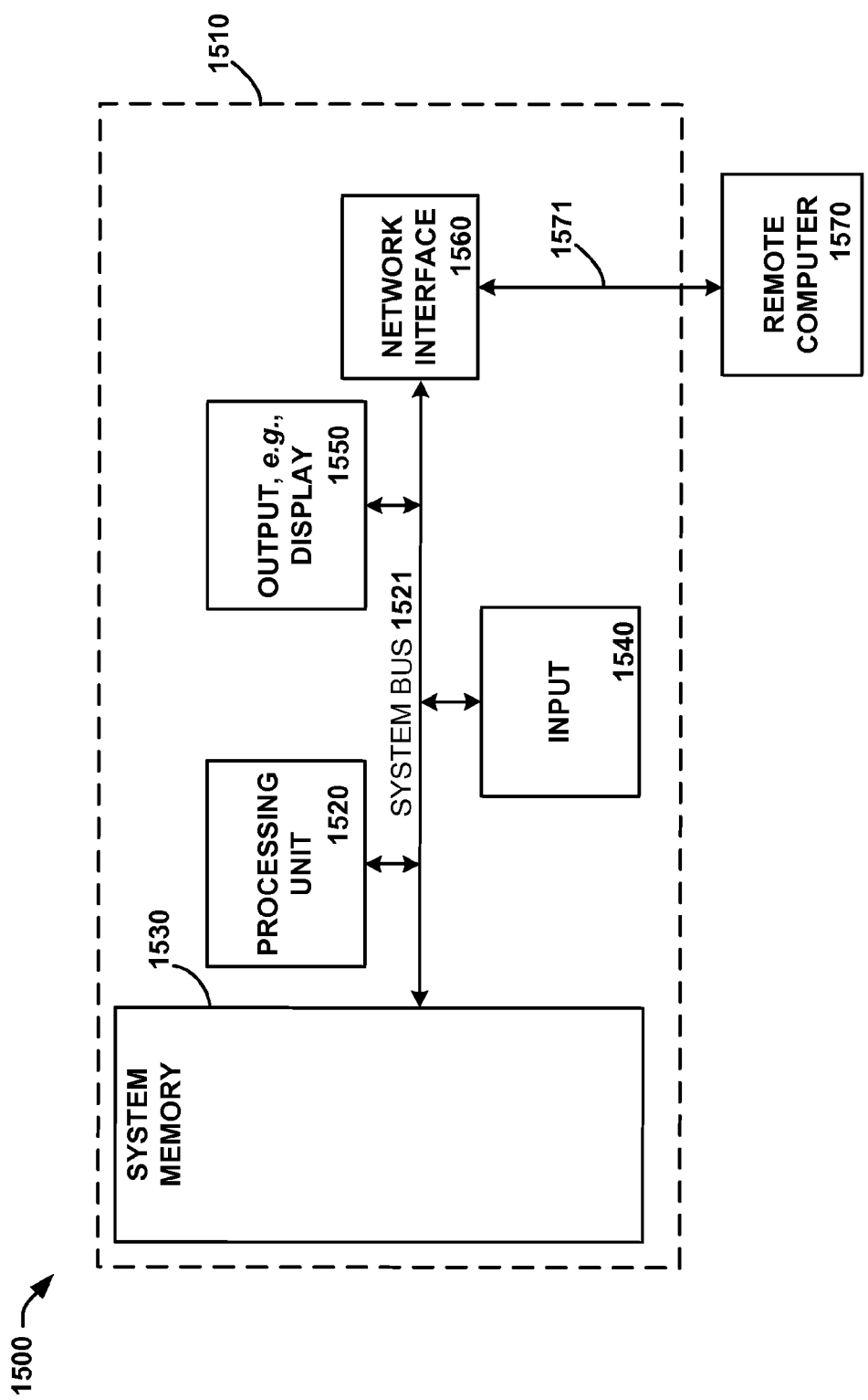
FIG. 15 illustrates a block diagram of an example electronic computing environment that can be implemented in conjunction with one or more aspects described herein.

As mentioned, advantageously, the techniques described herein can be applied to any device and/or network where it is desirable to map a plurality of signals (e.g., map a plurality of signals that comprise a plurality of signal types and/or a plurality of signal data rates). It is to be understood, therefore, that handheld, portable and other computing devices and computing objects of all kinds are contemplated for use in connection with the various non-limiting embodiments. Accordingly, the below general purpose remote computer described below in FIG. 15 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 15 thus illustrates an example of a suitable computing system environment 1500 in which some aspects of the disclosed subject matter can be implemented, although as made clear above, the computing system environment 1500 is only one example of a suitable computing environment for a device and is not intended to suggest any limitation as to the scope of use or functionality of the disclosed subject matter. Neither should the computing environment 1500 be interpreted as having any dependency or requirement relating to any one or combination of components illustrated in the exemplary operating environment 1500.

With reference to FIG. 15, an exemplary device for implementing the disclosed subject matter includes a general-purpose computing device in the form of a computer 1510. Components of computer 1510 may include, but are not limited to, a processing unit 1520, a system memory 1530, and a system bus 1521 that couples various system components including the system memory to the processing unit 1520. The system bus 1521 may be any of several types of bus structures including a memory bus or memory controller, a peripheral bus, and a local bus using any of a variety of bus architectures.

Computer 1510 typically includes a variety of computer readable media. Computer readable media can be any available media that can be accessed by computer 1510. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510. Communication media typically embodies computer readable instructions, data structures, program modules, or other data in a modulated data signal such as a carrier wave or other transport mechanism and includes any information delivery media.

The system memory 1530 may include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, may be stored in memory 1530. Memory 1530 typically also contains data and/or program modules that are immediately accessible to and/or presently being operated on by processing unit 1520. By way of example, and not limitation, memory 1530 may also include an operating system, application programs, other program modules, and program data.

The computer 1510 may also include other removable/non-removable, volatile/nonvolatile computer storage media. For example, computer 1510 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1521 through a non-removable memory interface such as an interface, and a magnetic disk drive or optical disk drive is typically connected to the system bus 1521 by a removable memory interface, such as an interface.

A user can enter commands and information into the computer 1510 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1520 through user input 1540 and associated interface(s) that are coupled to the system bus 1521, but may be connected by other interface and bus structures, such as a parallel port, game port, or a universal serial bus (USB). A graphics subsystem can also be connected to the system bus 1521. A projection unit in a projection display device, or a HUD in a viewing device or other type of display device can also be connected to the system bus 1521 via an interface, such as output interface 1550, which may in turn communicate with video memory. In addition to a monitor, computers can also include other peripheral output devices such as speakers which can be connected through output interface 1550.

The computer 1510 can operate in a networked or distributed environment using logical connections to one or more other remote computer(s), such as remote computer 1570, which can in turn have media capabilities different from device 1510. The remote computer 1570 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1510. The logical connections depicted in FIG. 15 include a network 1571, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1510 can be connected to the LAN 1571 through a network interface 1560 or adapter. When used in a WAN networking environment, the computer 1510 can typically include a communications component, such as a modem, or other means for establishing communications over the WAN, such as the Internet. A communications component, such as wireless communications component, a modem and so on, which can be internal or external, can be connected to the system bus 1521 via the user input interface of input 1540, or other appropriate mechanism. In a networked environment, program modules depicted relative to the computer 1510, or portions thereof, can be stored in a remote memory storage device. It will be appreciated that the network connections shown and described are exemplary and other means of establishing a communications link between the computers can be used.

Example Networking Environment

Figure 16:
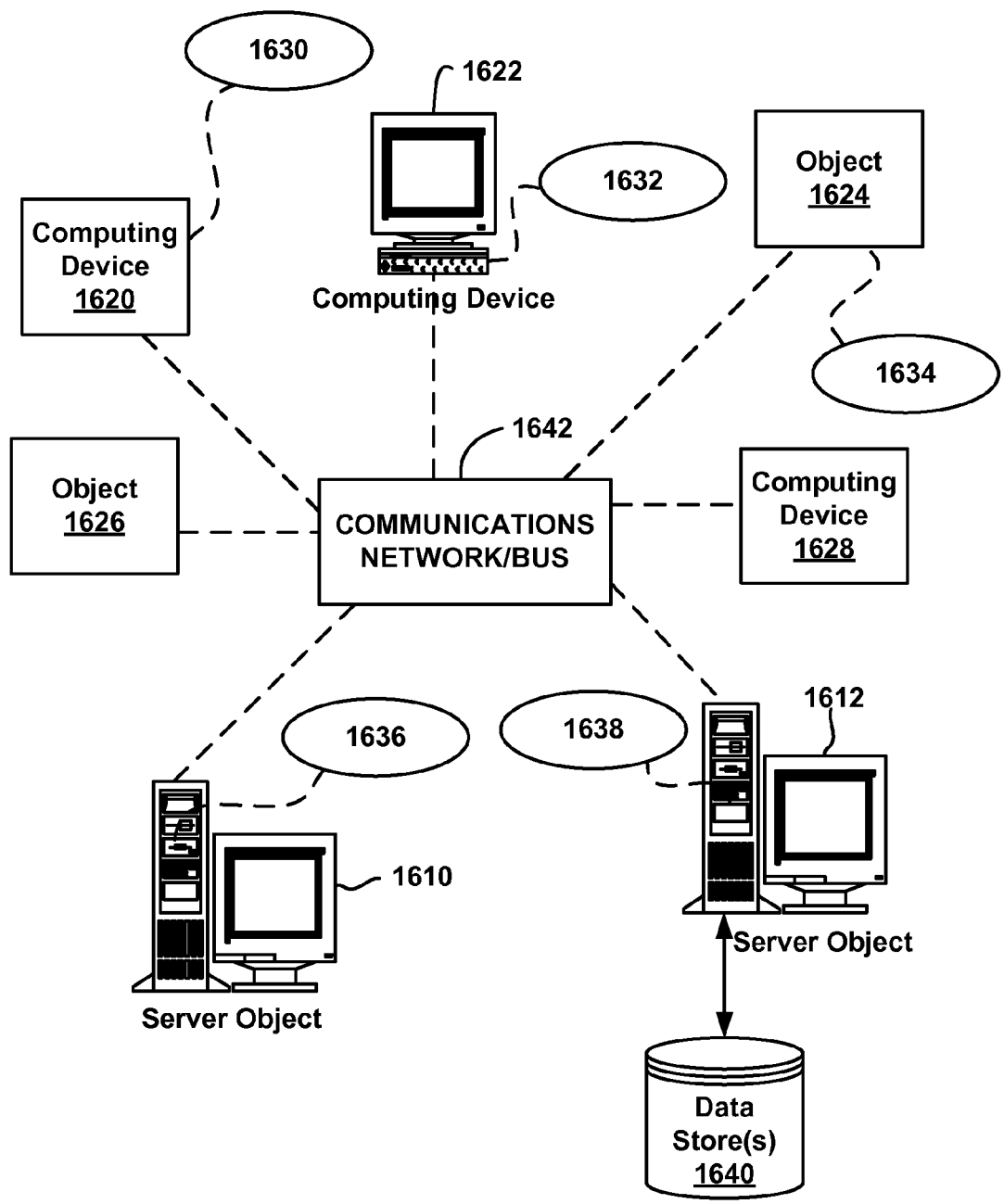
FIG. 16 illustrates a block diagram of an example data communication network that can be operable in conjunction with various aspects described herein.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638 and data store(s) 1640. It can be appreciated that computing objects 1610, 1612, etc. and computing objects or devices 1620, 1622, 1624, 1626, 1628, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1640 can include registers, or other similar data stores disclosed herein.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1642, either directly or indirectly. Even though illustrated as a single element in FIG. 16, communications network 1642 may comprise other computing objects and computing devices that provide services to the system of FIG. 16, and/or may represent multiple interconnected networks, which are not shown. Each computing object 1610, 1612, etc. or computing object or devices 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc., acting as servers provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1642 or bus is the Internet, for example, the computing objects 1610, 1612, etc. can be Web servers with which other computing objects or devices 1620, 1622, 1624, 1626, 1628, etc. communicate via any of a number of known protocols, such as the hypertext transfer protocol (HTTP). Computing objects 1610, 1612, etc. acting as servers may also serve as clients, e.g., computing objects or devices 1620, 1622, 1624, 1626, 1628, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
a memory storing computer executable components; and
a processor configured to execute at least the following computer executable components stored in the memory:
an aggregation component configured for generating a combined signal that comprises a higher data rate than a data rate associated with a plurality of signals based on mapped data associated with stuff data entities and the plurality of signals, the aggregation component comprising:
a mapper component configured for generating the mapped data based on a mapping distribution pattern associated with a generic mapping procedure, wherein a first data entity of the combined signal that comprises data associated with the plurality of signals is followed by a first number of the stuff data entities, and a second data entity of the combined signal that comprises other data associated with the plurality of signals is followed by a second number of the stuff data entities that is different than the first number of the stuff data entities, wherein the first number of the stuff data entities and the second number of the stuff data entities are determined based on the data rate associated with the plurality of signals, and a location of the stuff data entities with respect to the mapping distribution pattern is determined based on the data rate associated with the plurality of signals.

2. The system of claim 1, wherein the mapper component is configured for storing the mapped data in a plurality of container signals.

3. The system of claim 2, wherein a particular container signal from the plurality of container signals is inserted into a payload data field of a particular modified signal from a plurality of modified signals associated with the plurality of signals.

4. The system of claim 3, wherein a data rate of the plurality of modified signals is frequency-locked to a data rate of the combined signal.

5. The system of claim 2, wherein the plurality of container signals comprise data associated with the plurality of signals and other data associated with a predetermined data pattern.

6. The system of claim 5, wherein the plurality of container signals are rate adapted based at least in part on the predetermined data pattern.

7. The system of claim 5, wherein the mapped data comprises the data associated with the plurality of signals and the other data associated with the predetermined data pattern.

8. The system of claim 1, wherein the stuff data entities comprise one or more hexadecimal values.

9. The system of claim 1, wherein the mapping distribution pattern is generated based at least in part on a Sigma-Delta mapping algorithm.

10. The system of claim 1, wherein the first number of the stuff data entities and the second number of the stuff data entities are determined based on a ratio value associated with the data rate.

11. The system of claim 10, wherein the mapping distribution pattern is generated as a function of a ratio value determined based on the data rate of the plurality of signals.

12. The system of claim 1, wherein the mapping distribution pattern for the combined signal is determined based on data stored in a different signal from the plurality of signals.

13. The system of claim 1, further comprising a de-aggregation component configured for recovering the plurality of signals from a pseudo signal transmitted at a data rate of the combined signal, wherein the de-aggregation component comprises a de-mapper component configured for de-mapping the mapped data based on the mapping distribution pattern associated with the generic mapping procedure.

14. The system of claim 1, wherein the mapping distribution pattern is generated as a function of the first number of the stuff data entities and the second number of the stuff data entities.

15. A method, comprising:
receiving, by a system comprising a processor, a signal from a plurality of signals;
mapping, by the system, the signal based on a mapping distribution pattern associated with a generic mapping procedure to generate mapped data; and
generating, by the system, a combined signal that comprises a higher data rate than a data rate associated with the signal based on the mapped data, comprising determining a first number of stuff bytes and a second number of stuff bytes based on the data rate associated with signal, and determining, based on the data rate associated with the signal, a location for the first number of stuff bytes and the second number of stuff bytes with respect to the mapping distribution pattern, wherein a first data entity of the combined signal that comprises data associated with the plurality of signals is followed by the first number of stuff bytes, a second data entity of the combined signal that comprises other data associated with the plurality of signals is followed by the second number of stuff bytes, and the second number of stuff bytes is different than the first number of stuff bytes.

16. The method of claim 15, further comprising:
storing, by the system, the mapped data in a container signal; and
inserting, by the system, the mapped data into a payload data field of a modified signal associated with the signal.

17. The method of claim 16, wherein the generating the combined signal comprises generating the combined signal based on the modified signal.

18. The method of claim 17, further comprising:
transmitting, by the system, the combined signal;
recovering, by the system, the modified signal associated with the signal from the combined signal; and
de-mapping, by the system, the signal from the modified signal based on the mapping distribution pattern associated with the generic mapping procedure to recover the data rate associated with the signal.

19. The method of claim 15, wherein the mapping of the signal comprises determining the mapping distribution pattern based on the data rate associated with the signal.

20. The method of claim 15, wherein the mapping of the signal comprises mapping the signal based on a sigma-delta mapping algorithm to generate the mapped data.

21. A system, comprising:
a memory storing computer executable components; and
a processor configured to execute at least the following computer executable components stored in the memory:
an aggregation component configured for receiving a signal from a plurality of signals, and for mapping the signal based on a mapping distribution pattern associated with a generic mapping procedure to generate mapped data, the aggregation component comprising:
a mapper component configured for generating a combined signal that comprises a higher data rate than a data rate associated with the plurality of signals based on the mapped data, wherein a first data entity of the combined signal comprises a first subset of data associated with the plurality of signals, a second data entity of the combined signal comprises a second subset of data associated with the plurality of signals, the first data entity of the combined signal is followed by a first number of stuff data entities of the combined signal, the second data entity of the combined signal is followed by a second number of stuff data entities of the combined signal that is different than the first number of stuff data entities, the first number of the stuff data entities and the second number of the stuff data entities are determined based on the data rate associated with the plurality of signals, and a location of the stuff data entities with respect to the mapping distribution pattern is determined based on the data rate associated with the plurality of signals.

* * * * *